US010749953B2

(12) United States Patent
McCarthy et al.

(10) Patent No.: US 10,749,953 B2
(45) Date of Patent: *Aug. 18, 2020

(54) SYNCHRONIZATION SERVER PROCESS

(75) Inventors: Brendan A. McCarthy, San Francisco, CA (US); Carsten Guenther, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 13/616,638

(22) Filed: Sep. 14, 2012

(65) Prior Publication Data

US 2013/0006929 A1 Jan. 3, 2013

Related U.S. Application Data

(63) Continuation of application No. 13/195,780, filed on Aug. 1, 2011, now Pat. No. 8,290,908, which is a (Continued)

(51) Int. Cl.
*G06F 16/00* (2019.01)
*H04L 29/08* (2006.01)
(Continued)

(52) U.S. Cl.
CPC ........ *H04L 67/1095* (2013.01); *G06F 16/176* (2019.01); *G06F 16/27* (2019.01); *G06F 16/958* (2019.01); *H04L 67/02* (2013.01)

(58) Field of Classification Search
None
See application file for complete search history.

(56) References Cited

U.S. PATENT DOCUMENTS 5,684,984 A 11/1997 Jones et al.
5,706,509 A 1/1998 Man-Haktso
(Continued)

FOREIGN PATENT DOCUMENTS

EP 1291770 7/2006
EP 1845688 A1 * 10/2007 ......... H04L 67/1095
(Continued)

OTHER PUBLICATIONS

Highly Scalable OLTP DBMS for Managing Update-Intensive Stream Workload, Cha et al, Proceedings of the 30th VLDB Conference, Toronto, Canada, 2004.
(Continued)

*Primary Examiner* — Augustine K. Obisesan
(74) *Attorney, Agent, or Firm* — Fletcher Yoder PC

(57) ABSTRACT

Among other things, techniques and systems are disclosed for providing sync server process. Processing data sync sessions includes processing a request to initiate a sync session from one or more clients to update one or more data records that include one or more data items. The one or more clients are selectively identified as one of a trusted client and an untrusted client based on one or more properties of the sync session, wherein the trusted client is configured to support all dataclasses defined by the server. The one or more clients are detected as being configured to support field level differencing that sends changed data items only for the one or data records or record level differencing that sends all of the data items included in the one or more data records.

15 Claims, 13 Drawing Sheets

Related U.S. Application Data continuation of application No. 12/042,305, filed on Mar. 4, 2008, now Pat. No. 7,991,740.

(51) Int. Cl.
  *G06F 16/176* (2019.01)
  *G06F 16/27* (2019.01)
  *G06F 16/958* (2019.01)

(56) References Cited

U.S. PATENT DOCUMENTS

| | | | |
|---|---|---|---|
| 5,728,335 A | | 3/1998 | Neubauer |
| 5,758,355 A * | | 5/1998 | Buchanan ......... G06F 17/30575 |
| 5,884,325 A | | 3/1999 | Bauer et al. |
| 5,926,816 A * | | 7/1999 | Bauer ............... G06F 17/30578 |
| 5,999,937 A | | 12/1999 | Ellard |
| 6,026,408 A * | | 2/2000 | Srinivasan ........ G06F 17/30607 |
| 6,041,325 A | | 3/2000 | Shah et al. |
| 6,122,641 A * | | 9/2000 | Williamson ........ G06F 17/3041 |
| | | | 707/793 |
| 6,182,141 B1 | | 1/2001 | Blum et al. |
| 6,173,335 B1 | | 2/2001 | Culbert et al. |
| 6,247,135 B1 | | 6/2001 | Feague |
| 6,253,228 B1 | | 6/2001 | Ferris et al. |
| 6,317,754 B1 * | | 11/2001 | Peng ............................. 707/610 |
| 6,341,291 B1 | | 1/2002 | Bentley et al. |
| 6,393,434 B1 * | | 5/2002 | Huang et al. |
| 6,430,576 B1 | | 8/2002 | Gates et al. |
| 6,446,092 B1 | | 9/2002 | Sutter |
| 6,449,622 B1 | | 9/2002 | LaRue et al. |
| 6,728,335 B1 | | 4/2004 | Thomson et al. |
| 6,829,655 B1 | | 12/2004 | Huang et al. |
| 6,910,052 B2 | | 6/2005 | Gates et al. |
| 6,970,876 B2 | | 11/2005 | Hotti et al. |
| 7,149,813 B2 | | 12/2006 | Flanagin et al. |
| 7,490,112 B1 * | | 2/2009 | Suresh .................... G06F 16/27 |
| 7,860,825 B2 * | | 12/2010 | Chatterjee ............. G06F 16/182 |
| | | | 707/610 |
| 7,991,740 B2 | | 8/2011 | McCarthy et al. |
| 8,001,082 B1 * | | 8/2011 | Muratov ........... G06F 17/30578 |
| | | | 707/634 |
| 2002/0026474 A1 | | 2/2002 | Wang et al. |
| 2002/0029227 A1 | | 3/2002 | Multer et al. |
| 2002/0059299 A1 | | 5/2002 | Spaey |
| 2002/0065879 A1 | | 5/2002 | Ambrose et al. |
| 2002/0169745 A1 * | | 11/2002 | Hotti ................. G06F 17/30292 |
| 2002/0184521 A1 * | | 12/2002 | Lucovsky ........... G06F 21/6218 |
| | | | 726/6 |
| 2003/0093441 A1 * | | 5/2003 | Cooke ............... G06F 17/30575 |
| 2003/0115301 A1 * | | 6/2003 | Koskimies ............. H04L 29/06 |
| | | | 709/221 |
| 2003/0131025 A1 * | | 7/2003 | Zondervan et al. ......... 707/200 |
| 2003/0177408 A1 * | | 9/2003 | Fields et al. .................. 713/400 |
| 2003/0182327 A1 * | | 9/2003 | Ramanujam .......... G06F 16/273 |
| 2003/0217181 A1 * | | 11/2003 | Kiiskinen ......... G06F 17/30581 |
| | | | 709/248 |
| 2004/0019614 A1 | | 1/2004 | Wang |
| 2004/0024875 A1 * | | 2/2004 | Horvitz ............. G06F 17/30873 |
| | | | 709/226 |
| 2004/0064484 A1 * | | 4/2004 | Polan ................. G06F 17/30575 |
| 2004/0103174 A1 | | 5/2004 | Balducci et al. |
| 2004/0133591 A1 | | 7/2004 | Holenstein et al. |
| 2004/0224675 A1 * | | 11/2004 | Puskoor .................. H04L 29/06 |
| | | | 455/419 |
| 2005/0055382 A1 | | 3/2005 | Ferrat et al. |
| 2005/0071358 A1 * | | 3/2005 | Hind et al. .................... 707/101 |
| 2005/0102328 A1 | | 5/2005 | Ring et al. |
| 2005/0198084 A1 | | 9/2005 | Kim |
| 2005/0246415 A1 | | 11/2005 | Belfiore et al. |
| 2005/0251523 A1 | | 11/2005 | Rajamani et al. |
| 2006/0015539 A1 * | | 1/2006 | Wolf et al. .................... 707/201 |
| 2006/0041603 A1 * | | 2/2006 | Paterson et al. ............. 707/204 |
| 2006/0075105 A1 | | 4/2006 | Momtchilov et al. |
| 2006/0080363 A1 | | 4/2006 | Vadlamani et al. |
| 2006/0085837 A1 * | | 4/2006 | Pesati ................. G06F 21/6227 |
| | | | 726/1 |
| 2006/0088038 A1 | | 4/2006 | Ravula et al. |
| 2006/0112150 A1 | | 5/2006 | Brown et al. |
| 2006/0136511 A1 | | 6/2006 | Ngo et al. |
| 2006/0136513 A1 | | 6/2006 | Ngo et al. |
| 2006/0136518 A1 | | 6/2006 | Creamer et al. |
| 2006/0150079 A1 | | 7/2006 | Albornoz et al. |
| 2006/0155716 A1 * | | 7/2006 | Vasishth ................. G06Q 10/06 |
| 2006/0172724 A1 * | | 8/2006 | Linkert et al. ............. 455/412.1 |
| 2006/0190984 A1 | | 8/2006 | Heard et al. |
| 2006/0219772 A1 * | | 10/2006 | Bernstein .......... G06F 17/30348 |
| | | | 235/379 |
| 2006/0242210 A1 | | 10/2006 | Ring et al. |
| 2006/0248083 A1 * | | 11/2006 | Sack .................... G06F 21/6218 |
| 2006/0259524 A1 | | 11/2006 | Horton |
| 2006/0277224 A1 * | | 12/2006 | Aftab et al. ................... 707/201 |
| 2006/0277590 A1 | | 12/2006 | Limont et al. |
| 2006/0278694 A1 * | | 12/2006 | Jha .......................... G06F 21/51 |
| | | | 235/379 |
| 2007/0038642 A1 * | | 2/2007 | Durgin .............. G06F 17/30575 |
| 2007/0100834 A1 | | 5/2007 | Landry et al. |
| 2007/0130216 A1 * | | 6/2007 | Wolfgang ........... G06F 11/1451 |
| 2007/0130217 A1 * | | 6/2007 | Linyard ............. G06F 17/30581 |
| 2007/0162518 A1 | | 7/2007 | Tian |
| 2007/0185920 A1 * | | 8/2007 | Castro ............... G06F 17/30578 |
| 2007/0204346 A1 * | | 8/2007 | Meier .................. H04L 63/1433 |
| | | | 726/25 |
| 2007/0226272 A1 | | 9/2007 | Huang et al. |
| 2007/0255744 A1 | | 11/2007 | Gideoni et al. |
| 2007/0260475 A1 | | 11/2007 | Bhanote |
| 2007/0271309 A1 * | | 11/2007 | Witriol ................ H04L 67/1095 |
| 2008/0082555 A1 * | | 4/2008 | Salmon et al. .............. 707/100 |
| 2008/0104277 A1 * | | 5/2008 | Tian .................... H04L 61/1582 |
| | | | 709/248 |
| 2008/0155112 A1 | | 6/2008 | Ma et al. |
| 2008/0270485 A1 * | | 10/2008 | Yu .......................... G06F 16/275 |
| 2008/0294729 A1 | | 11/2008 | Ionescu et al. |
| 2009/0077002 A1 * | | 3/2009 | Clark et al. ...................... 706/59 |
| 2009/0228509 A1 | | 9/2009 | McCarthy et al. |
| 2010/0030846 A1 * | | 2/2010 | Martin .............. G06F 17/30581 |
| | | | 709/203 |
| 2011/0289050 A1 | | 11/2011 | McCarthy et al. |

FOREIGN PATENT DOCUMENTS

| | | |
|---|---|---|
| EP | 1014266 | 1/2008 |
| EP | 2306347 | 4/2011 |
| GB | 2421606 | 6/2006 |
| WO | WO 2005024626 A1 * | 3/2005 |
| WO | WO2005116892 | 12/2005 |
| WO | WO2006132534 | 12/2006 |
| WO | 2009/111495 A1 | 9/2009 |

OTHER PUBLICATIONS

Analysis Specification and Generation of Mobile Computer Data Synchronisation, Ye et al, Proceedings of the International Conference on Mobile Business (ICMBB'05), 2005.

DBC—A database computer for very large databases, Banerjee et al, IEEE Transaction on computers, vol. c28, No. 6 Jun. 1979.

Enabling Ubiquitous database access with XML, Lei et al, MDA'99, LNCS 1748, pp. 119-134, 1999.

Luca Prati et al., "XDMS-Network Address Book enabler," Hewlett-Packard OpenCall Software, pp. 1-4.

OMA Open Mobile Alliance, "SyncML Data Sync Protocol, Candidate Version 1.2—Jun. 1, 2004," Open Mobile Alliance, OMA-SyncML-DataSyncProtocol-V1_2-200400601-C, 2004 Open Mobile Alliance Ltd., XP-002375712, pp. 1-77.

PCT Notification of Transmittal of the International Search Report and Written Opinion of the International Search Authority, or the Declaration in PCT/US2009/035912 dated Jun. 5, 2009.

Non-Final Office Action in U.S. Appl. No. 12/240,538 dated Jun. 18, 2010.

Extended European Search Report in EP Patent Application No. 09154249.8 dated Jun. 24, 2009.

(56) References Cited

OTHER PUBLICATIONS

Examiner Aaron J. Sanders, Office Action in U.S. Appl. No. 12/607,921 dated Oct. 1, 2010, 29 pages.
PCT Invitation to Pay Additional Fees in PCT/US2008/071812 dated Apr. 28, 2009.
European Search Report in Application No. 08161817.5 dated May 8, 2009.
Notification of Transmittal of the International Search Report and the written Opinion of the International Searching Authority, or the Declaration in PCT/US2008/071812 dated Jul. 3, 2009.
Non-Final Office Action in U.S. Appl. No. 11/834,604 dated Nov. 27, 2009.
Apple Inc., Sync Services Programming Guide, Cocoa > Syncing [Online], XP-002532278, Oct. 31, 2007, © 2004, 2007 Apple Inc., Cupertino, pp. 1-372, URL:httplideveloper.apple.cornidocumentationteocoalConceptual/SyncServices/SyncServicespdf.
PCT Notification of Transmittal of the International Search Report and Written Opinion of the International Search Authority, or the Declaration in PCT/US2009/035909 dated Jul. 14, 2009.
Extended European Search Report in Application No. 09154256.3 dated Jul. 2, 2009.
Apple Inc., "Sync Services Framework Reference, Cocoa > Syncing," [Online] Oct. 31, 2007, XP002532279, © 2004, 2007 Apple Inc., URL: http://Developer.apple.com/documentation/Cocoa/Reference/SyncServicesRef_ObjC/SyncServicesRef_ObjC.pdf, pp. 1-275.
PCT Notification of Transmittal of the International Search Report and Written Opinion of the International Search Authority, or the Declaration in PCT/US2009/058414 dated Feb. 23, 2010.
Extended European Search Report in EP Patent Application No. 09171413.9 dated Feb. 18, 2010.
Extended European Search Report in EP Patent Application No. 08161817.5 dated Aug. 3, 2009.
European Examination Report in EP Patent Application No. 08161817.5 dated Mar. 4, 2010.
WIPO International Search Report and Written Opinion dated May 6, 2009, International Application No. PCT/US2009/035912.
Examiner Yavor Boyadzhiev, Extended European Search report, EP Application No. 11190642.6, dated Feb. 7, 2012, 10 pages.
Privacy Preserving Schema and Data Matching, Scannapieco et al. SIGMOD, Jun. 12-14, 2007.

* cited by examiner

SYNCHRONIZATION SERVER PROCESS

CLAIM OF PRIORITY

This application is a continuation of, and hereby claims priority under 35 U.S.C. § 120 to, pending U.S. patent application Ser. No. 13/195,780, which is titled "Synchronization Server Process," by inventors Brendan A. McCarthy and Carsten Guether, which was filed on 1 Aug. 2011, and which is incorporated by reference. This application is also a continuation of, and claims priority under 35 U.S.C. § 120 to, U.S. patent application Ser. No. 12/042,305, which issued as U.S. Pat. No. 7,991,740 on 2 Aug. 2011, which is titled "Synchronization Server Process," by inventors Brendan A. McCarthy and Carsten Guether, which was filed on 4 Mar. 2008, to which parent application Ser. No. 13/195,780 claims priority, and which is incorporated by reference.

TECHNICAL FIELD

This application relates to data sync server processes.

BACKGROUND

Network appliances that serve as remote data repositories can store data uploaded from a local client. Data stored in the remote data repositories can be modified, managed, shared with other clients, used to construct web pages, etc. Data synchronizing between a client and a server can be performed using synchronization protocols such as Open Mobile Alliance—Data Synchronization protocol OMA DS/SyncML (formerly known as the SyncML protocol). The OMS DA/SyncML is a sync protocol that enables serial synchronization of dataclasses and can require five or more roundtrips per dataclass.

SUMMARY

Among other things, techniques and systems are disclosed for providing a sync server that performs various sync server processes.

In one aspect, processing data sync sessions includes processing a request to initiate a sync session from one or more clients to update one or more data records that include one or more data items. The one or more clients are selectively identified as one of a trusted client and an untrusted client based on one or more properties of the sync session, wherein the trusted client is configured to support a schema defined by the server for the one or more dataclasses. The one or more clients are detected as being configured to support field level differencing that sends changed data items only for the one or data records or record level differencing that sends all of the data items included in the one or more data records.

Implementations can optionally include one or more of the following features. When detecting that the one or more clients are configured to support record level differencing, changed data items in the one or more data records can be identified. Also, in response to processing the sync session, a change log can be generated for one or more changes associated with the one or more data records. In addition, in response to processing the sync session, a data repository associated with the server can be updated to reflect the one or more changes to the one or more data records identified in the generated change log. Further, a bridge client can be used to access another data repository and modify data records stored in the accessed other data repository based on the updated data repository associated with the server. Also, accessing and modifying the other data repository can include processing the generated change log to update the other data repository. Further, updates to the one or more data records can be received form the one or more clients, and one or more conflicts can be identified between the clients and the server's data store. The updates from the clients can be mingled. Also, the identified one or more conflicts can be resolved by assigning priority to a most recent one of the one or more clients requesting the sync session. In addition, when detected that the one or more clients are identified as the untrusted client, one or more discrepancies can be detected in the set of changes associated with the untrusted client from the schema defined by the server for the one or more data records involved in the set of changes associated with the untrusted client. The one or more properties of the changes from the client can include unique identifiers for the data items included in the data records.

In another aspect, the techniques described in this specification can be implemented as a computer program product, embodied on a computer readable medium, which is operable to cause a data processing apparatus to perform various operations. The computer program product can be operable to cause a data processing apparatus to process a request to initiate a sync session from one or more clients to update one or more data records that include one or more data items. The computer program product can be operable to cause a data processing apparatus to selectively identify the one or more clients as one of a trusted client and an untrusted client based on one or more properties of the sync session, wherein the trusted client is configured to enforce relational data integrity constraints for a schema defined by the server for the data records. The computer program product can be operable to cause a data processing apparatus to detect whether the one or more clients are configured to support field level differencing that sends changed data items only for the one or data records or record level differencing that sends all of the data items included in the one or more changed data records.

Implementations can optionally include one or more of the following features. The computer program product can be operable to cause a data processing apparatus to identify the changed data items in the one or more data records when detecting that the one or more clients are configured to support record level differencing. The computer program product of claim can be operable to cause a data processing apparatus to, in response to processing the sync session, generate a change log for one or more changes associated with the one or more data record; and update a data repository associated with the server to reflect the one or more changes to the one or more data records identified in the generated change log. The computer program product can be operable to cause a data processing apparatus to use a bridge client to access another data repository and modify the accessed other data repository based on the updated data repository connected to the server. The computer program product can be operable to cause a data processing apparatus to access the other data repository including processing the generated change log to update the other data repository. In addition, the computer program product can be operable to cause a data processing apparatus to receive updates to the one or more data records form the one or more clients. One or more conflicts are identified between the received updates and data records stored at a datastore associated with the server. The updates from the clients are mingled so as to ensure that each participant (client or server datastore)

receives a set of updates to the data set which, when applied to the receiver's datastore, will result in an identical data set in all remote datastores. The computer program product can be operable to cause a data processing apparatus to resolve the identified one or more conflicts by assigning priority to a most recent one of the one or more clients. Further, the computer program product of can be operable to cause a data processing apparatus to identify one or more discrepancies in a set of changes associated with the untrusted client from the schema defined by the server for the one or more data records involved in the set of changes associated with the untrusted client when detected that the one or more clients are identified as the untrusted client. The one or more properties of the sync session can include unique identifiers for the data items included in the data records.

In another aspect, a system includes A processor configured to operate a transport protocol that enables opening of one or more connections to one or more clients devices configured to sync data in one or more sync modes and one or more sync protocols that enables the server to synchronize one or more dataclasses with the one or more clients over the opened one or more connections. The one or more sync protocols enables the server to perform various operations. The sync protocol enables the server to process a request to initiate a sync session from one or more clients. The one or more sync protocols also enables the server to selectively identify the one or more clients as one of a trusted client and an untrusted client based on one or more properties of the sync session, wherein the trusted client is configured to support a schema defined by the server for the data records. Further, the one or more sync protocols enables the server to detect whether the one or more clients are configured to support field level differencing that sends changed data items only for the one or data records or record level differencing that sends all of the data items included in the one or more data records.

Implementations can optionally include one or more of the following features. The processor is configured to operate the one or more sync protocols to identify the changed data items in the one or more data records when the one or more clients are configured to support record level differencing. In addition, the processor can be configured to operate the one or more sync protocols to perform the following in response to processing the sync session: generate a change log for one or more changes associated with the one or more data record; and update a data repository associated with the server to reflect the one or more changes to the one or more data records identified in the generated change log. The processor can be configured to operate the one or more sync protocols to use a bridge client to access another data repository and modify data records stored in the accessed data repository based on the updated data repository connected to the server. Also, the processor can be configured to operate the one or more sync protocols to modify the other data repository by processing the generated change log to update the other data repository. In addition, the processor can be configured to operate the one or more sync protocols to receive updates to the one or more data records from the one or more clients, and identify one or more conflicts between the received updates and data records stored at a datastore associated with the server. The updates from the one or more clients can be mingled. The processor can be configured to operate the one or more sync protocols to resolve the identified one or more conflicts by assigning a priority to a most recent one of the one or more clients requesting the sync session. Further, the server can be configured to identify one or more discrepancies in a set of changes associated with the untrusted client from the schema defined by the server for the one or more data records involved in the set of changes associated with the untrusted client when detected that the one or more clients are identified as the untrusted client. The one or more properties of the sync session can include unique identifiers for the data items included in the data records.

Techniques and systems according to the present specification can be implemented to potentially provide various advantages. The sync server processing as described in this specification can enable sync change processing at various granularities. For example, the sync server can accept field level differencing wherein only the changed data (the difference) are exchanged. This can reduce unnecessary updates of unchanged data items to other clients and servers. In addition, the sync server supports trusted and untrusted clients. When interfacing with a trusted client, the sync server can skip certain integrity checks that may be necessary for untrusted clients to improve scalability of the server.

BRIEF DESCRIPTION OF THE DRAWINGS

Like reference symbols and designations in the various drawings indicate like elements.

DETAILED DESCRIPTION

Techniques and systems are disclosed for managing synchronizations between a server and multiple clients.

Figure 1:
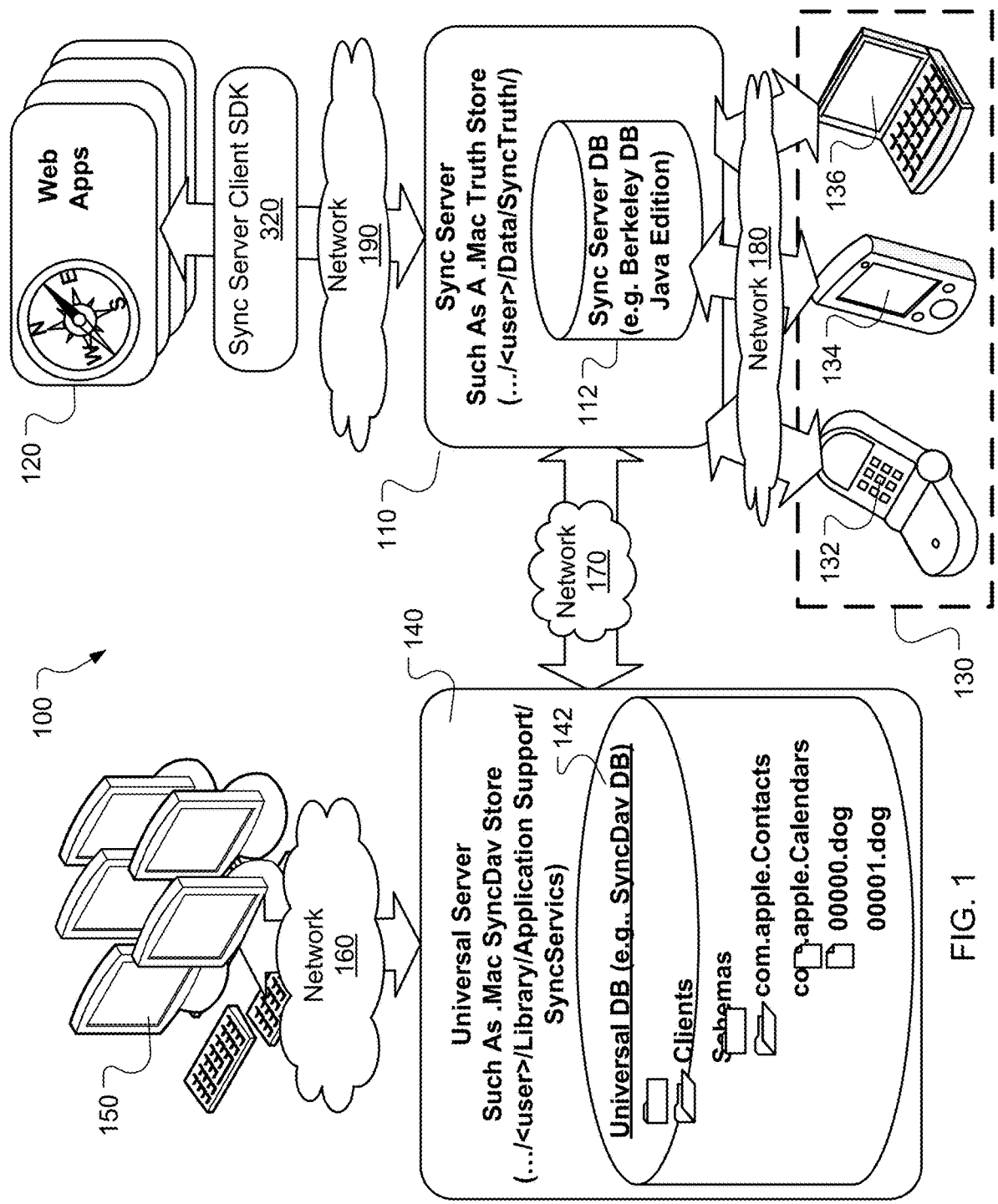
FIG. 1 is a block diagram showing an example system for synchronizing multiple client types and multiple clients with one or more servers.

FIG. 1 is a block diagram showing an example system 100 for synchronizing data between a server and multiple clients. The system 100 includes a sync server 110 connected to a universal server 140 over a network 170. The sync server 110 is designed to interface with one or more web clients 120 over a network 190. Also, the sync server 110 is designed to interface with one or more client devices 130 over a network 180. The sync server 110 is connected to a sync data repository 112 to enable the sync server 110 to operate as a data store for the web clients 120 and client devices 130. A database management system (DBMS) database is one type of data repository 112 that could be used. The universal server 140 is designed to interface with one or more client computers 150 such as desktops and laptops over a network 160. The universal server 140 is connected to a universal data repository 142 to enable the universal server 140 to operate as a universal data store. The networks 160, 170, 180 and 190 can include various wired and wireless networks such as local area network (LAN), wide area network (WAN), Ethernet, Internet, etc. The networks 160, 170, 180 and 190 can be a single network or each can be a separate network.

The universal server 140 can include a web server that provides web services and Internet tools such as Dot Mac® web services and tools. The available web services can be integrated with the operating system (OS) of a desktop or laptop. For example, the Dot Mac® services and tools can be closely integrated with the Mac® OS. One of the available Dot Mac® services includes the iDisks® online disk storage service that can be mounted as any other volume on the Mac® OS desktop. Also, the public portion of another user's iDisk® can be mounted to the desktop. Using the iDisks®, a user can upload and download files to and from the desktop. Also, iWeb® can enable users to create web pages that can be uploaded to iDisk® and be published. Similarly, other data can be uploaded and/or downloaded to and from iDisk® using iCal®, iMovie®, iPhoto®, Garage-Band® and iTunes® libraries tools, among others. Other Dot Mac® services can include web e-mail service through @mac.com that supports both Post Office Protocol (POP) and Internet Message Access Protocol (IMAP).

The universal server 140 can enable computer-to-computer synchronization using a structured data synchronization semantics layered over Web-based Distributed Authoring and Versioning (WebDAV). WebDAV is a set of extensions to the Hypertext Transfer Protocol (HTTP) which allows users to collaboratively edit and manage files on remote World Wide Web servers. WebDAV provides functionality to create, change and move documents on a remote server or web server such as the universal server 140. WebDAV enables general web-based file storage that can be accessed from anywhere by any computers.

In operation, the WebDAV protocol enables each client to lock a particular resource to prevent undesired modification by another client. The WebDAV also supports various features such as creation, removal, and querying of information about author, modified date, etc. WebDAV supports name space management to enable resources (such as web pages or other documents) to be copied and moved within a server's namespace. Further, WebDAV enables creation, removal, and listing of resources.

The structured data synchronization semantics layered over WebDAV can include a synchronization Distributed Authoring and Versioning (SyncDAV) protocol that enables the computer-to-computer synchronization. For example, the SyncDAV protocol can enable Mac®-to-Mac® sync in Mac® OS X (Tiger/Leopard). Also, SyncDAV protocol can enable a computer to sync with the iDisk® or with other computers to update & sync various user data, such as address book entries, iCal dates, Safari bookmarks, keychains, mail accounts, mail rules, mail signatures, smart mailboxes, etc.

The web client 120 can include various Dot Mac® web applications. In addition, the client device 130 can include mobile devices, such as a mobile phone 132, a personal digital assistant (PDA) 134, a handheld data processing devices 136, etc. The mobile phone 132 can include smart phones and integrated mobile devices such as the iPhone®. The handheld data processing devices can include audio playback devices such as MP3 players and iPod® devices.

Synchronization is a process of maintaining consistency between two distinct datastores by periodically comparing the changes which have occurred to each since the last time the datastores were known to be consistent. The datastores can include the web clients 120 and client devices 130 on one side and the sync server 110 and the universal server 140 on the other side. To synchronize data with each side, the datastores are configured with various capabilities. For example, each datastore is configured to supply all data when requested. In addition, each datastore is configured to identify and supply changes since the time of the last synchronization. Each datastore is configured to agree on the schema to be kept in sync. Each datastore is configured to agree on the data representation. Each datastore is configured to agree on the semantics of synchronization primitives (i.e. add, update, delete). Further, each datastore is configured to rollback to a previous state should a problem occur during a sync to avoid corrupting the datastores.

The synchronized data follows the relational model and is divided into "schemas" or "dataclasses" that group definitions of structured data types ("entities"). Each dataclass is represented by a schema, which is a network of related entities and properties. Entities within a given dataclass may refer to one another via "relationships". Relationships between entities in discrete dataclasses are forbidden, and thus each dataclass is wholly independent of other dataclasses. From a user's perspective, dataclasses may appear to be managed from separate dedicated applications. For example, the "contacts" dataclass can be managed primarily by an address book application, while the "calendars" dataclass can be managed by a calendar application.

The sync server 110 enables various synchronization modes including slow, reset and fast. The first time a client device and a server sync, all data for a dataclass are exchanged to "match" existing data items that are considered identical. To optimize syncing and network bandwidth usage for subsequent sync operations, the client devices 130 and server 110 can exchange only the data that has changed since the last time the pair synchronized. Thus, each entity (i.e., client device or server) should be capable of determining what local changes should be sent to the other entity. In addition, each entity should be able to detect whether a situation has occurred which require exchanging more data before "fast" syncing can be resumed.

The slow sync mode may be required when the client device 130 and sync server 110 sync for the first time to establish a common baseline for subsequent difference-only data exchange. During a slow sync, the client device 130 sends all data for a dataclass to the sync server 110. The server attempts to match these data items with those that are already known to the sync server 110. Failure to perform proper "identity matching" can result in undesirable duplication or merging of data. The sync server 110 then responds with data items missing at the client devices 130.

The reset sync mode is used to reset all data for the dataclass on the client device 130 with the server's data. This can occur when the data structure has been pushed to the client device 130, or if the server 110 or client device 130 determine that the device's local data is corrupt. The client device 130 sends no data, and the server responds with the complete data structure for the dataclass.

The fast sync mode is the most efficient mode, especially when using a limited bandwidth connection. The client device 130 sends only those data that have changed since the last sync with the sync server 110. The sync server 110 responds with only those data that have changed external to the client device 130.

The sync server 110 is a scalable solution for providing multiple web clients 120 and client devices 130 with read/write access to data synchronized to the central data repository 142. The sync server 110 manages sync transactions for the multiple web clients 120 and client devices 130 to update one or more data records stored in the sync data repository 112. The sync server 110 processes the sync sessions, and the updated sync data repository 112 is synchronized with the central data repository 142 associated with the universal server 140. In synchronizing the sync data repository 112 with the central data repository 142, the sync server 110 operates as another client of the universal server 140. Thus, to the universal server 140, the sync server 110 behaves like one of the computer clients 150.

To enable efficient and scalable sync services, the sync server 110 implements the sync data repository 112 based on an embedded B-Tree that does not need Structured Query Language (SQL). The sync data repository 112 is an embedded data storage such as Berkeley DB® that includes everything on the sync server 110 except for the actual database. The Berkeley DB Java Edition ("Berkeley DB JE", or "BDB JE", or "JE") is a pure Java database (from Oracle® Corporation, Redwood City, Calif.). Berkeley DB provides a highly-scalable, high-performance, transactional B-Tree database. Implementations are not limited to the Berkeley DB. In some implementations, other persistence mechanisms, such as Hibernate can be used. Hibernate is an object/relational persistence and query service for Java and .Net.

The Oracle Berkeley DB is an open source embeddable database engine that provides developers with fast, reliable, and local data persistence. As an embedded database, the Berkeley DB library links directly into the web client applications 120. After linking with the Berkeley DB, the web client applications 120 can access data locally through simple function calls, thereby eliminating the performance penalty of network-based protocols commonly used in client-server architectures. Similarly, as Berkeley DB is a non-SQL database, the application developers can define specific data access patterns. Given the amount of control and options provided by the Berkeley DB, application developers can gain more optimized and predictable access to the data itself.

The local sync data repository 112 is non-relational with no SQL overhead. Also, the local sync data repository 112 is in-process with no client-server overhead. The local sync data repository 112 can provide convenient collections-style interface to the data. Further, having a separate store for each user reduces risk.

The sync server 110 has special case handling for binary data properties (e.g. that are represented by "data" in the schema defined by the server 110). An example in the "com.apple.Contacts" schema is the "image" property on the "com.apple.contacts.Contact" entity. While the persistence store is capable of serializing and storing these data types, it may be more efficient to store them separately from properties using more compact data types. The sync server 110 can store binary large objects (BLOBS) in the "Blob" directory, and organizes them by dataclass and record ID. A BLOB is a collection of binary data stored as a single entity in a database management system. BLOBS include images, audio or other multimedia objects. In some instances, a binary executable code can be stored as a blob. References to the BLOB data are converted to file reference URIs. To achieve this, the sync server 110 implements an interceptor which can be used to intercept and mutate arbitrary data coming from data providers before it is persisted in the central data repository 142 or the sync data repository 112. The interceptors can convert BLOB data to a file reference, and serialize the actual BLOB data. This enables the sync server 110 to remove the bulky data out of memory early in the process of performing a sync, which improves scalability. It also allows the sync server 110 to share these BLOB references with other backend applications which have direct access to the central data base 142 and/or the sync server 112, which further improves sync server's performance when these processes need to fetch the data. Furthermore, BLOB references stored to the central data base 142 may be provided direct read-only accessed by server processes 140, and 110 to clients 150, 120, and 130 via their respective networks 160, 190, and 180. This allows the sync server 110 to share responsibility for accessing bulky data with other server processes. BLOBs can be stored as external files.

The sync server 110 relies on minimal schema for representing the sync data repository 142 that eliminates the need to maintain record snap shots for each sync session. For example, the sync server 110 uses dataclasses that includes a set of entities that are interrelated. The sync server 110 supports various dataclasses by using a text or binary property list files (plist). In the Mac® OS X Cocoa, NeXTSTEP and GNUstep programming frameworks, plists are files that store serialized objects, for example. The plists are often used to store a user's settings, similar to the function of the Windows registry on Microsoft Windows®. Property list files are also used to store information about bundles and applications. A plist is easy to generate and parse using standard operating system (OS) features, such as NSPropertyListSerialization class. For example, the sync server 110 can use the Mac® OS 10 plist and generate internal object models for the dataclasses to understand how to support and sync each dataclass. This permits the sync server 100 to support additional dataclasses dynamically by modifying the server's configuration, without requiring the sync server itself to change.

Figure 2:
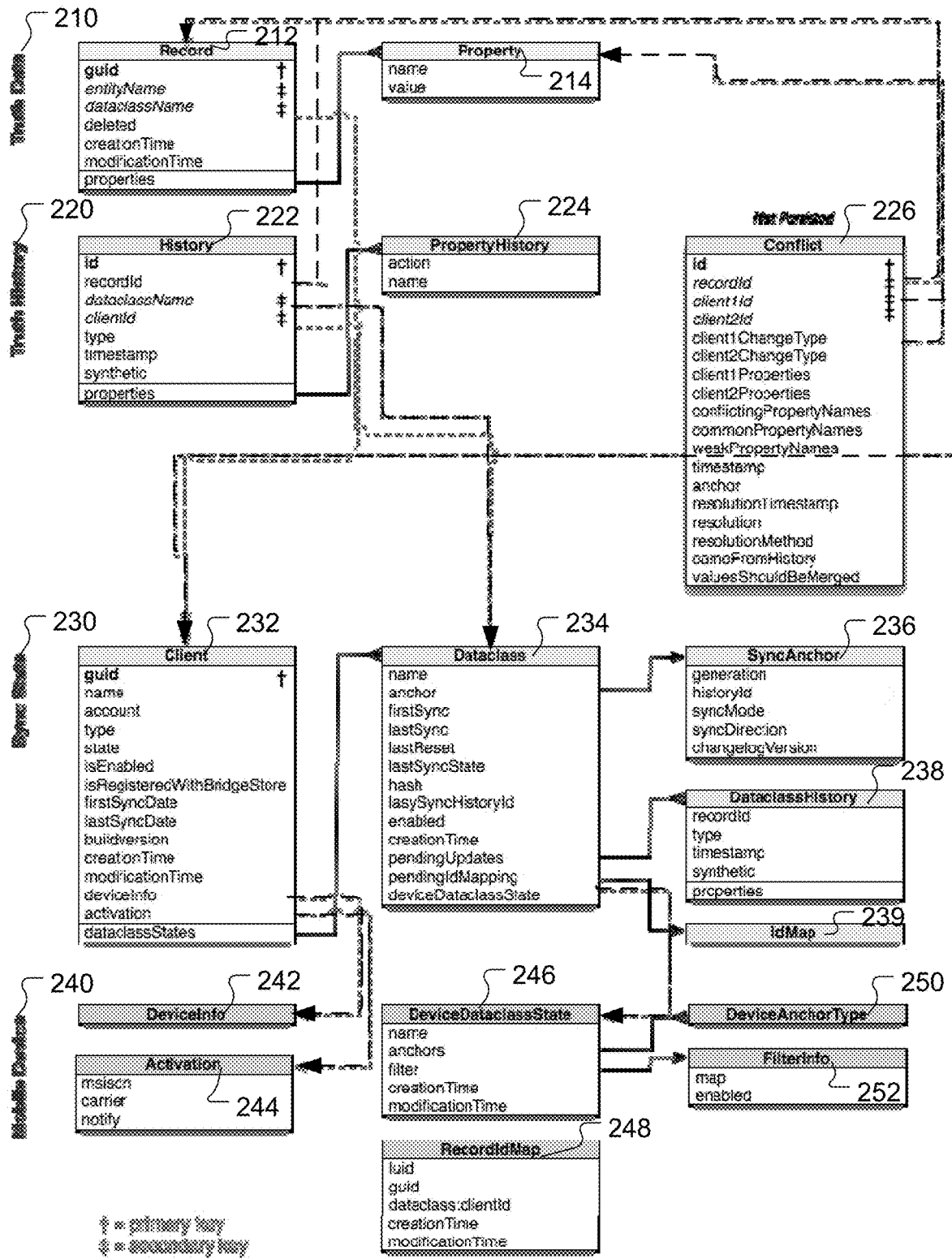
FIG. 2 shows an example internal model of a sync server for maintaining sync database and client states.

FIG. 2 shows an example data model supported by the sync server 110. The sync server 110 generates an object data model for each dataclass that represents entity records, properties, record changes (add, modify, delete), property changes (set, clear) and id-mappings. The sync server 110 presents itself as both a structured data store and a SyncEngine, and the sync server's 110 internal persistence model balances the requirements for: (1) Truth access (current version of any dataclass and/or entity) 210; (2) History management (field level differences along a timeline of relevant events) 220; (3) Client state (last known position in history, sync mode, client type) 230; and (4) Device specifics 240 for the client devices 130. Each of these requirements is logically separated in the schema of the sync server.

The Truth data 210 contains the full, current set of data for the user. The Truth data 210 is stored in the central data repository 140. The Truth data 210 enables rapid data access with minimal SyncEngine logic for a client wishing to simply get the current data. The Truth data 210 can include one or more data records 212 that includes various entities such as global unique identifier (GUID), entity name, dataclassName, deleted, creationTime, modificationTime, etc. Each record 212 is associated with various parameters 214 such as name and value.

The Truth History 220 presents an ordered timeline of events (ordered by History.id). The Truth History 220 includes one or more history data 222 with various entities including ID, recordId, dataclassName, clientId, type, timestamp, synthetic, etc. Each Truth history data 222 is associated with one or more history properties 224 such as action and name. The Truth History also includes Conflict data 226. To avoid redundancy, actual record values are not stored in the Truth History. For example, the sync server 110 is not a versioning system. Instead the sync server 110 stores information about what records and properties were changed (e.g., FLD), whether a record was added, modified, or deleted, and which client made the change. Conflicts also logically fall in this area. However, the conflicts may not persist in the Truth.

The client state 230 can include various entities used to maintain the existence of a given client and the synchronization state for each dataclass. The client state entities includes the GUID, name, account, type, state, is Enabled, is RegisteredWithBridgeStore, firstSyncDate, lastSyncDate, buildversion, creation time, modification time, deviceinfo, or activation. Associated with each client are dataclasses 232. The dataclasses include name, anchor, fastSync, lastSync, last reset, lastSyncState, hash, lastSyncHistory, enabled, creation time, pending updates, pending Id mapping and deviceDatacclass State.

In addition, each dataclass is associated with a sync Anchor 236, dataclass The sync Anchor information can include generation, historyid, syncMode, syncDirection, and changelogVersion. The dataclass can be associated with dataclass history 238. The dataclass history 238 can include recordld, type, time stamp. Further, each dataclass can be associated with IdMapping 239.

The device state 240 can include DeviceInfo 242 and Activation 244, which are related to the client data 232. The Activation 244 can include msisdn, carrier and notify elements. Also, the device state 240 can include DeviceDataClassState 246 that includes various entities including name, anchors, filter, creationTime and modificationTime. The device or client state 240 can include RecordidMap 248 that includes various data entities including LUID, GUID, dataclass:clientID, creation time, and modification time. The DeviceDataclassState 246 can include DeviceAnchorType 250 and filter information such as map and enabled. The entities here are used specifically by OTA clients 130.

Trusted Clients.

The sync server 110 is configured to support both trusted client and untrusted clients. When interfacing with a trusted client, the sync server can skip certain integrity checks that may be necessary for untrusted clients. A trusted client is a client that fulfills a certain contract with the sync server 110. For example, a trusted client supports the use of sync server ID as the native ID. Thus, the Local Unique Identifier (LUID) of the trusted client is replaced by the Universal Unique Identifier (UUID) generated by the sync server 110. In addition, a trusted client supports all entities and properties of the sync server 110. Further, a trusted client guarantees that changes injected are maintained according to the schema of the sync server 110. The schemas or dataclasses supported by the sync server 110 include Contacts, Calendars and Bookmarks.

When interfacing with untrusted clients, the sync server 110 can attempt to deal with the changes sent by the untrusted clients. The sync server 110 can look at the structure of data changes requested by the untrusted clients and decide whether the requested data changes are legal (consistent with the requirements of the sync server 110). Also, the sync server 110 can decide whether the requested record changes make sense for the identified schema. For example, the sync server can determine whether the untrusted clients are attempting to add a record that does not have a required property. The sync server can determine whether the untrusted clients are trying to modify a record by setting relationships with related IDs that don't exist. When the sync server 110 detects an illegal data change request, the sync server 110 flags the change. Changes that the sync server 110 can't change are rejected. In some instances, certain illegal data changes may be fixed by the sync server 110 and accepted without explicit client intervention.

For example, the following illegal data change may be fixed by the sync server 110. Consider an untrusted client sending a request to add a contact and a phone number. There is a "to-many" relationship between the contact and the phone number. The contact entry can be assigned to many phone numbers, for example. For a primary phone number, the relationship is one-to-one since a contact has one primary phone number. When the untrusted client adds a contact and a phone number, the phone number is linked to the contact. The phone number itself has a contact relationship or a back pointer back to the associated contact. Thus, when a contact is added with a phone number, the relationships should be specified. Many of the relationships have an inverse. The phone number's relation in the contacts dataclass has an inverse relationship on the phone number entity which is the contact relationship. For example, the "contacts.phone_numbers" can represent a relationship, and the inverse relationship to that relationship can be presented as "phone_number_entity.contact_property" inverse relationship. When the one or more of the relationships are missing or incorrect, the sync server 110 can correct the missing or incorrect relationships, such as the inverse relationship.

In another example, a contacts entity such as Foo can be referencing a phone number entity, Bar. In an untrusted client, the phone number entity, Bar's, contacts back pointer may incorrectly be referencing back to contacts entity, Baz. The sync server 110 can correct this incorrect back pointer. A trusted client would not generate such an incorrect relationship.

Thus, when the sync server 110 is interfacing with an untrusted client, and the back pointer for the inverse relationship is not set, sync server 110 looks at this and determines that this is not legal. In addition, the sync server 110 may know what it can do to fix the error. The sync server 110 synthesizes a property set on the phone number for the contacts entity with a back pointer to the contacts entity that was referencing the phone number. Thus, for an untrusted client, the sync server 110 can help by synthesizing property changes that are acceptable to the sync server 110. In addition, the sync server 110 can notify the untrusted client that this fix based on sync server inference has been performed.

The sync server 110 can determine, a priori, whether a client is trusted. Certain clients are identified or detected to be trusted by the virtue of using particular protocols. For example, software development kit (SDK) clients 120 are trusted by the virtue of using a SDK based protocol. SDK is a set of development tools that enables a software engineer to create applications for a certain software package, software framework, hardware platform, computer system, video game console, operating system, or similar platform. In addition, SyncDAV clients 150 are also trusted. SyncDAV is a wired protocol based on WebDAV used to store changes from a computer client 150 (e.g., a Mac®) on the universal server 140 such as the Dot Mac® server.

The sync server 110 can also dynamically determine whether the client is a trusted client. The sync server 110 can make such determination by detecting the properties of the current sync. For example, an untrusted client may have been updated (e.g., by updating the firmware) to operate as a trusted client. Then on the next sync, the sync server 110 would detect that the client is a trusted client. In addition, the sync server 110 can detect whether the client sends LUID or UUID, for example. Also, the sync server 110 can detect a flag set in the client definition of the device information for the client. Further, the sync server 110 can detect that the client is using the slow sync mode, and thus the changes are RLD and not FLD. In addition, the client may interface with the server 110 via a sync server client SDK 320 and thus indicate that those clients conforming to the published SDK are trusted clients. In some implementations, a library of trusted clients can be published to set a standard of accepted trusted clients.

Every synchronized datum has a universal unique record ID or UUID. For efficiency sake, the sync server 110 can use the UUIDs of the SyncServices on Mac® OS X. Alternatively, an application on the client device 130 can use its local unique IDs (LUIDs) for data to promote local datastore efficiency, for example.

The server 120 enables the client devices 130 (datastores) to use their own LUID to refer to data items as needed. In this case, the server 120 maintains a LUID to UUID mapping to enable the client device 130 to transparently reference global records by using its own local IDs. The server 120 reestablishes new mappings when a "slow" or "reset" sync mode is accepted for the dataclass.

The sync server 110 sets authoritative sync server UUIDs for the trusted clients. By setting an authoritative UUID for each data entity, the sync server 110 can do away with the LUID-Global Unique Identifier (GUID) mapping. For untrusted clients, the sync server 110 maintains the LUID-GUID mapping 248 as necessary. The LUID-GUID mapping enables external clients to access a data entity by the client's own local identifier. However, this requires additional bookkeeping on how changes are represented. By requiring the trusted clients, such as web apps, to support sync server's UUID, the costly LUID-GUID mapping can be avoided. This can reduce processing jobs for the sync server 110, for example.

When a data item that a client is adding already exists in the sync data repository 112, the sync server 110 can perform identity matching. When an identity match is detected, the sync server 110 notifies the client that the data item should be referenced by the new UUID of the sync server 110. For example, consider two Macs® attempting to sync a similar dataset (e.g., a bunch of address contacts). These are trusted clients using SyncDAV protocol. Each Mac® will assign its own UUID to the data entities. When the first Mac® syncs with the universal server 140, the UUID from the first Mac® is accepted because that data entity does not yet exist, based on identity matching. The sync server 110 is notified of the sync and consequently the sync server 110 performs a SyncDAV sync to obtain the added data entity with the UUID assigned by the first Mac®. Then when the second Mac® syncs the same dataset and provides it's own UUID, via slow sync, the sync server 110 does not accept this new UUID and assigns the other UUID value from the first Mac®.

Field Level Differencing Vs. Record Level Differencing

The difference in data can be synchronized in various granularities. When exchanging synchronization data, the client devices 130 and the web clients 120 may send the complete data for each changed record for a record-level differencing (RLD). Alternatively, only those changed fields of each changed record can be sent for a field-level differencing (FLD). FLD may be preferred over RLD, especially when data records include many fields, or contain large amounts of data, such as images in the contact dataclass.

The server 110 can dynamically support both RLD and FLD representations of data received from the client device 130. The data representation for the change indicates whether the client device 130 and/or the web clients 120 are using RLD or FLD for a given dataclass. This provides client device datastore implementation with maximum flexibility when the complexity of maintaining meta information to support FLD is unreasonable.

When receiving RLD changes, the sync server 110 internally converts the changes to FLD format for processing, storage and communication efficiency. The sync server 110 expects an RLD client device 130 to send complete records. Data fields that are supported by the client device 130 and are missing from the client device's data record are assumed to have been cleared/deleted by the client device 130. However, a mechanism can be provided to enable the client device 130 to indicate that certain data field exceptional values are unchanged without sending the values.

A RLD client may send the entire dataset with flags to indicate the changed data entities. A FLD client sends only the changed data entities. In some implementations, trusted clients may only send FLD changes. Using FLD reduces bandwidth usage and unnecessary updates to other clients and servers having access to the central data repository 142.

Conflicts Resolution

When two or more clients attempt to change the same data entities and/or properties, a conflict may exist. For example, when two clients attempt to change the last name of a contacts entry, the sync server 110 tries to auto-resolve the conflict. When determining which change to accept, temporal ordering may be used. The sync server 110 attempts to determine the most recent change and assigns a higher priority to that change.

However, temporal ordering can be tricky. For example, sync server 10 may not be able to trust the internal clock of the client, and so using a time stamp is risky. Also, the temporal ordering maybe affected by the quality of the network used by each client. In general, when conflicts are detected, the sync server 110 assigns the higher priority to the client that initiates the current sync.

In some instances, some changes, even when more recent, can be considered weaker or should be assigned a lower priority than an older change. For example, the type of change, RLD or FLD may affect which change gets the higher priority. First, the sync server 110 detects a change to Contacts with First and Last Name from a RLD client. Then a change from an FLD client to add a middle name is detected. When the RLD client sends a new phone number, the RLD client has not seen the added middle name. Thus, although this is the most recent sync, the empty middle name is not detected as a clear or delete because the sync server 110 understands that the change is from the RLD client. The sync server 110 does not delete the middle name during the RLD to FLD inference in this instance. Thus, the synthesized changes (inferred clear) by the sync server 110 are consider weaker changes even when more recent. While the user knows the order that the user entered the changes, that order may not be so obvious to the sync server 110.

Synchronizing the Central Data Repository with the Sync Data Repository

SyncDAV change logs are files that indicate a set of record changes. A single record change pertains to one record of data and represents one of three operations: (1) add, (2) modify or (3) delete. Every modify change has property changes that includes property name, property value, and action. Also, the action can be set or clear.

Whenever a client is synchronized with the sync server 110, a change log is generated. The generated change log includes the latest record changes and headers. Also, the generated change log is compressed. For example, in Mac® OS 10 Cocoa classes, a class called NSArchiver is implemented to takes an object graph of an object and serialize it into a memory or a file. To reduce space, a run-length tokenization of the reoccurring objects is performed. Thus, each object is encoded once, and each encoded objects can be refer to its token. A token can include a values including a number.

A change log can be rather complicated and not in an open format. The NSArchiver is re-implemented in Java to enable sync server client SDK library 320 clients to understand Cocoa classes such as NSArray and NSMutableArray; NSDictionary and NSMutableDictionary; NSSet and NSMutableSet; NSData and NSMutableData; NSDate and NSCalendarDate; NSTimeZone and NSLocalTimeZone; NSColor; NSURL; etc.

The sync server 110 can read those classes and archive links to the universal server 140 (e.g., a Mac® OS10 server). The change logs are used to bridge the sync server 110 with a Universal Server 140 or network storage such as an iDisk®. The change logs are serialized set of changes for a dataclass that has its own relational integrity. The change logs do not reference entity that doesn't exist yet.

The sync server 110 is configured to read the change logs and bridge the central data repository 142 (e.g., SyncDAV data stores) with the client devices 130 such as the iPhones® and web clients 120 such as Web Apps. The change logs are stored in series and are additive. By processing a series of change logs, the sync server 110 processes a series of transactions. Thus, when the sync server 110 is done processing a certain number of change logs, the sync server 110 can obtain a version of the central data repository. When the sync server 110 processes all of the change logs, the sync server can obtain the current version of the central data repository 142.

The sync server 110 serializes the change logs and syncs with the central data repository 142. During this process, the sync server 110 is presented to the universal server 140 (such as the SyncDAV server) as just another SyncDAV Client 150 to the SyncDAV server. Thus, to the SyncDAV server, sync server 110 behaves like another Mac® client, for example.

The SyncDAV protocol is for layering sync semantics over WebDAV primitives. WebDAV supports get, put, delete and lock operations. These are standard functions for a WebDAV server, such as a iDisk®. The universal server 140 operating as a WebDAV server can sync SyncDAV changes between two Macs®, for example.

When synchronizing with the central data repository 142, a lock is placed on the WebDAV resources associated with the syncing dataclass and client. This effectively blocks other clients from syncing that same dataclass for the duration of the sync operation. Thus, the SyncDAV protocol can lead to various contentions with serialization.

The sync server 110 enables a quick access to the central data repository 142. Thus, the clients of the sync server 110 need not be aware of the syncing. The sync server 110 treats the clients like individual datastores.

In addition, the sync server 110 is decoupled from the SyncDAV store, the central data repository 142. To promote fast and efficient syncing, the sync server 110 can't afford to wait for a client to finish syncing before serving up the data for a web app client 120. Thus, the local sync data repository 112 (e.g., Berkeley database) for the server 110 is implemented, which can operate as a backup to the central data repository 142, the SyncDAV data store.

To maintain the two data repositories (the sync data repository 112 and central data repository 142) synced, a bridge client is generated. In SyncDAV, every syncing client must have a representation in the SyncDAV datastore, the central data repository 142. Because the sync server 110 behaves like a SyncDAV client 150, the sync server 110 creates one of those representations. Thus, to the universal server 140, the SyncDAV server, the sync server appears to be similar to another Mac®.

The sync server 110 performs seamless dynamic syncs with the central data repository 142 to avoid locking out any other clients. For example, a client device 130 such as an iPhone may be updating contacts with the sync server 110. At the same time, another client such as a Mac® may be performing a scheduled sync of the same contacts with the universal server 140, the SyncDAV server. The central data repository 142, the SyncDAV datastore, may be locked by the Mac®, and the sync server 110 notices the lock. The sync server 110 does not prevent the changes from the iPhone from getting into the central data repository 142. Because the sync server 110 includes the internal sync data repository 112, the sync server 110 update its internal sync data repository 112. Later, when the sync with the Mac® is completed, the sync server 110 receives a notification by a backend process that the central data repository 142, the SyncDAV server, has changes to update. This triggers a sync between the two data repositories and the changes are picked up by both data repositories. Being able to update to the internal sync data repository 112 can avoid blocking the client device (e.g., iPhone) when the central data repository 142, the SyncDAV datastore, is busy syncing changes from the SyncDAV client.

In some implementations, when the sync data repository 112 gets damaged, the sync server 110 can restore the data from the central data repository 142 by serializing and processing the SyncDAV change logs. The central data repository 142 can do the same with the sync data repository 112. Thus, each data repository can function as a backup for the other data repository.

The sync server 110 connects with the client devices 130 and the web clients 120 using a transport protocol such as HTTP transport protocol to complete a secure data connection. For example, over the transport protocol, the sync server 110 uses an over-the-air (OTA) synchronization protocol to enable data synchronization between the connected client devices 130 and the sync server 110. Synchronized data can include various data classes such as contacts (e.g., addresses and phone numbers), calendar, etc. Data synchronization can be performed over the network 180. An example OTA sync protocol and the schema supported by the sync server 110 are described in U.S. Pat. No. 7,747,784 issued Jun. 29, 2010 (entitled, "Data Synchronization Protocol"), the contents of which are incorporated by reference as a part of this specification.

Over the transport protocol, the sync server 110 can sync with the web clients 120 using the sync server client SDK library 320. In one implementation, the sync server client SDK library 320 may be implemented as a jar file using the Java platform. For example, the sync server 110 can implement sync server client SDK library 320 to guarantee that the web client 120 behaves as a trusted client that fully supports the sync server's schema and dataclasses. The sync server client SDK library 320 can be implemented to perform all of the relational integrity check, generate the UUID on the web client 120 for the sync server 110 to accept. sync server client SDK library 320 can handle setting the relationships and guarantee that the record it transfers to the sync server 110 is the same before transferring the record to the sync server 110.

In addition, sync server client SDK library 320 also handles exceptions such as data repository reset exception handling on the sync server side. When a client device 130 pushed the entire dataset, and then when a web client 120 attempts to update the dataset, the web client 120 receives an exception message stating that the web client must reload the dataset from the central data repository before client device 130 can send the update. Because the web clients 120 are detected as trusted clients, the relational integrity check is offloaded from the sync server 110 to the sync server client SDK library 320. In addition, the sync server client SDK library 320 shields the web client 120 from the complexity of the sync server 110.

The sync server client SDK library 320 implements a complete object model of the sync server's schema. In some implementations, a Java class for each dataclass is generated. For example, a Java class for contacts, and a Java class for e-mail address are generated. Then the sync server client SDK library 320 sets the relationships between the email address and the contacts. When the web client 120 calls for the sync operation, the sync server client SDK library 320 pushes the changes to the sync server 110. The sync server client SDK library 320 understands the required properties and relationships for the sync server 110 schema and ensures that user of the sync server client SDK library 320 follows the required properties and relationships. The sync server client SDK library 320 sends a runtime error to the user when the client attempts to submit changes containing bad data (i.e., outside of the sync server schema.) Thus, the responsibility of enforcing correctness in the schema can be offloaded from the sync server's CPU. The sync server client SDK library 320 can be run on another CPU usually in a web application.

The sync server 110 can Improve back end scalability and simplicity by enabling at least 1.5M syncs/day. Also, the sync server 110 supports trickle-sync changes to the sync server 110.

Figure 3:
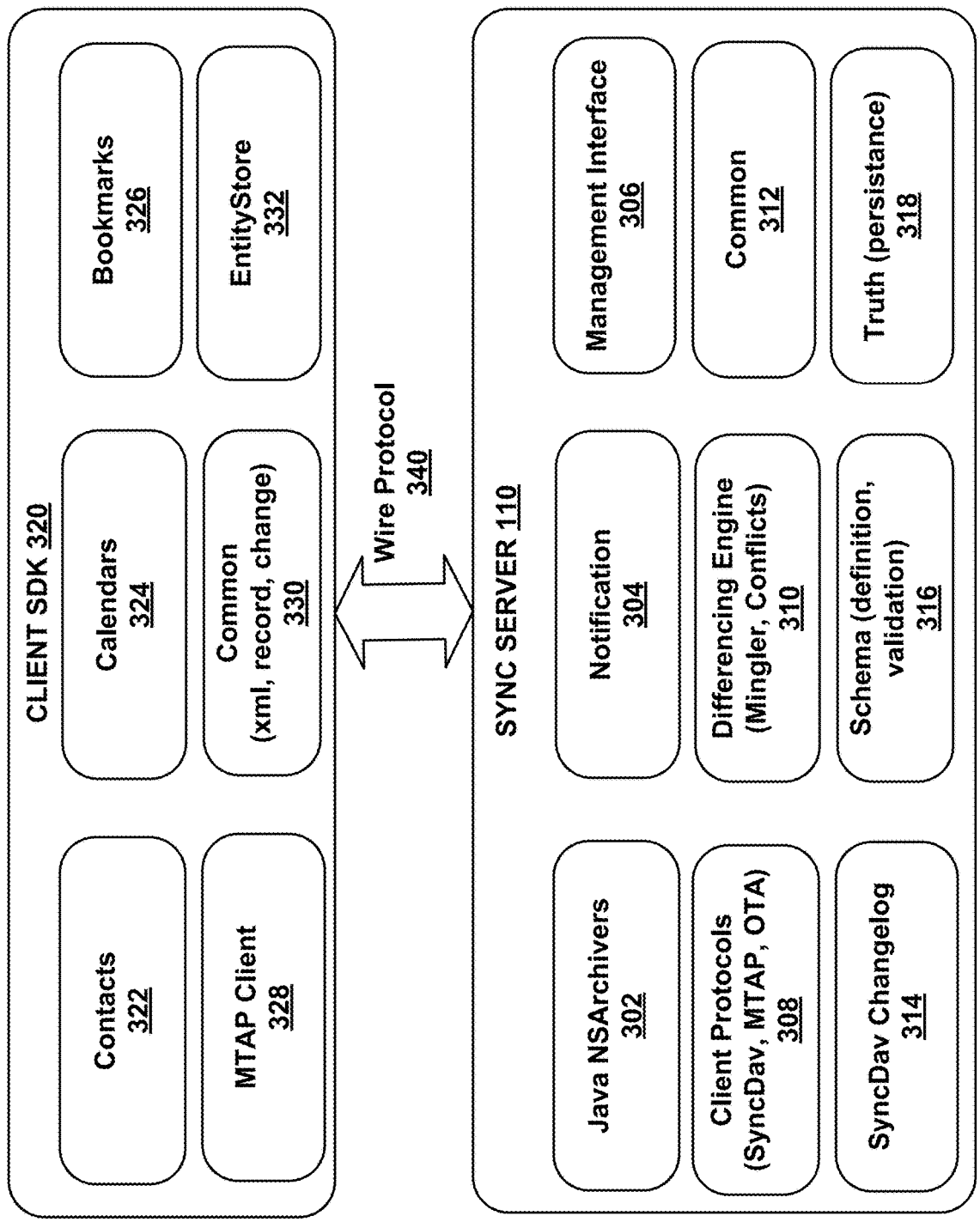
FIG. 3 is a block diagram showing an example application architecture for a sync server.

FIG. 3 is a block diagram showing an example application architecture for the sync server 110. The sync server 110 includes various components that operate the various functions described in this specification. For example, the sync server 110 can include Java NSArchivers component 302, a Notification mechanism 304, a Management Interface 306, Client Protocols mechanism 308, a Differencing Engine (Mingler, Conflicts) 310, a Common component 312, a SyncDAV Changelog component 314, a Schema (definition, validation) component 316 and a Truth (persistence) component 318. The server 110 is connected over a protocol 340 to a client SDK 320. The SDAP protocol 340 can include a wire protocol such as sync server client SDK.

The sync server client SDK 320 is a library that provides access to the sync server through sync server data access protocol (SDAP), without requiring client 120 to have specific protocol knowledge. SDAP 340 is a protocol for accessing the sync data repository 112 and perform synchronization. SDAP consists of the XML schema for sync data repository 112 data and changes; HTTP protocol semantics that define a URL scheme for dataclasses, records and properties; the semantics for HEAD, GET, PUT and DELETE; and custom X-headers for exchanging sync-specific data, such as client ids and sync anchors.

SDAP 340 enables a client 120 to interface with Sync-Server 110 (aka Metropolis). The sync server 110 supports basic and digest authentication. The communication between the web client 120 and the sync server 110 is not encrypted because the web client (e.g., web apps) 120 and the sync server 110 are both deployed internally on the server side. SDAP can supports basic authentication. The sync server 110 or a separate gateway server can include authentication and session handling to support syncing with Over-the-Air (OTA) clients 130. In addition, SDAP provides facilities for registering devices and enabling/disabling syncing for individual dataclasses.

SDAP enables the web clients 120 to synchronize with the sync server 110 and access the sync data repository 112 without requiring a complex client sync state machine. SDAP allows stateless access to synchronized data in the sync data repository 112 and the central data repository 142 with response time goals in the sub-500 milliseconds range. SDAP can replace any existing protocol (e.g., Sync API) between various servers, such as the Dot Mac servers (Replicant, SFDEs and the WOAs). In addition, SDAP enables syncing of various dataclasses including Contacts, Calendars and Bookmarks. The example dataclasses with Apple® extensions include "com.apple.Contacts", "com.apple.Calendars" and "com.apple.Bookmarks". Further, SDAP enables web applications 120 and client devices 130 to trickle-sync with the sync server 110. A client application, a web client 120 for example, that wants to use SDAP must support field-level changes and preserve properties in their entirety as delivered by the API The sync server client SDK 320 may be a Java library that provides access to the sync server 110 through SDAP without requiring specific protocol knowledge. In some implementations, the sync server client SDK 320 can be implemented using other languages and technologies. The Sync Server client SDK 320 provides an object-model for the main dataclasses (Bookmarks, Contacts and Calendars, etc.) and enables clients to sync data with the sync server without necessarily having their own datastore. As described above, to improve server scalability, the SDK offloads the task of ensuring relational integrity enforcement from the server to the client (making it a trusted client) and eliminates the need for a LUID-GUID mapping on the server. The sync server client SDK is used by the .Mac Contacts and Calendar Web-Oriented Architectures (WOAs) to sync with the sync server 110.

SDAP defines its own XML schema to describe the sync data repository 112 and sync operations such as "record" and "property" changes. The XML schema for SDAP follows the data model of the sync server 110. For example, the XML schema can represent the entity records; properties; record changes such as add, modify and delete; property changes such as set and clear; and id-mapping.

The sync server client SDK 320 includes various components that can be used during a sync session with the sync server 110. The sync server client SDK 320 can include the supported schemas or dataclasses defined by the sync server 110. These dataclasses can include Contacts 322, Calendars 324, and Bookmarks 326. Each of these dataclasses includes data items organized by relationships. The sync server client SDK 320 also include a SDAP Client component 328, a Common (XML, Record, Change) component 330 and an EntityStore 332.

Figure 4:
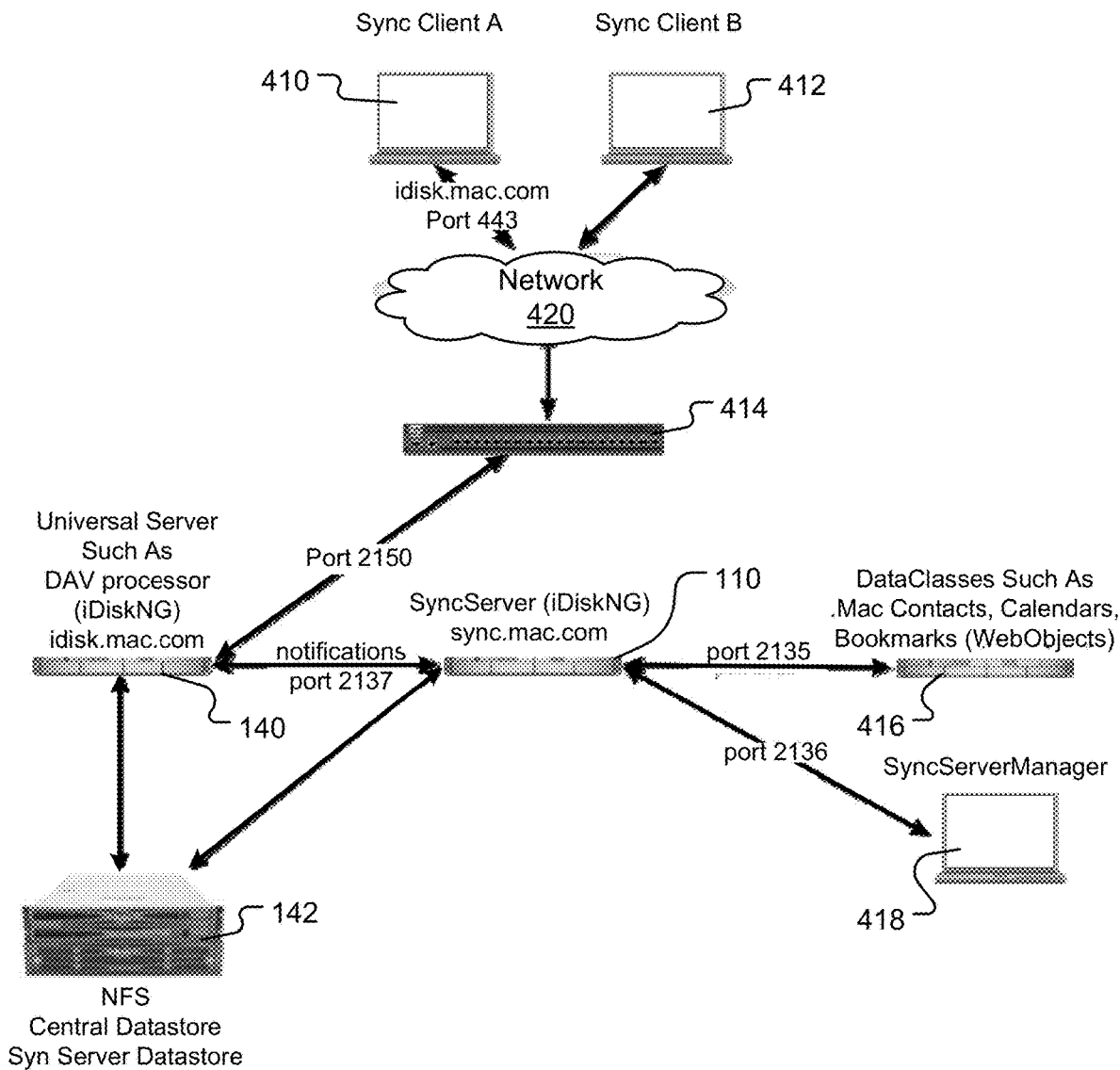
FIG. 4 is a block diagram showing an example sync server system architecture.
Figure 5A:
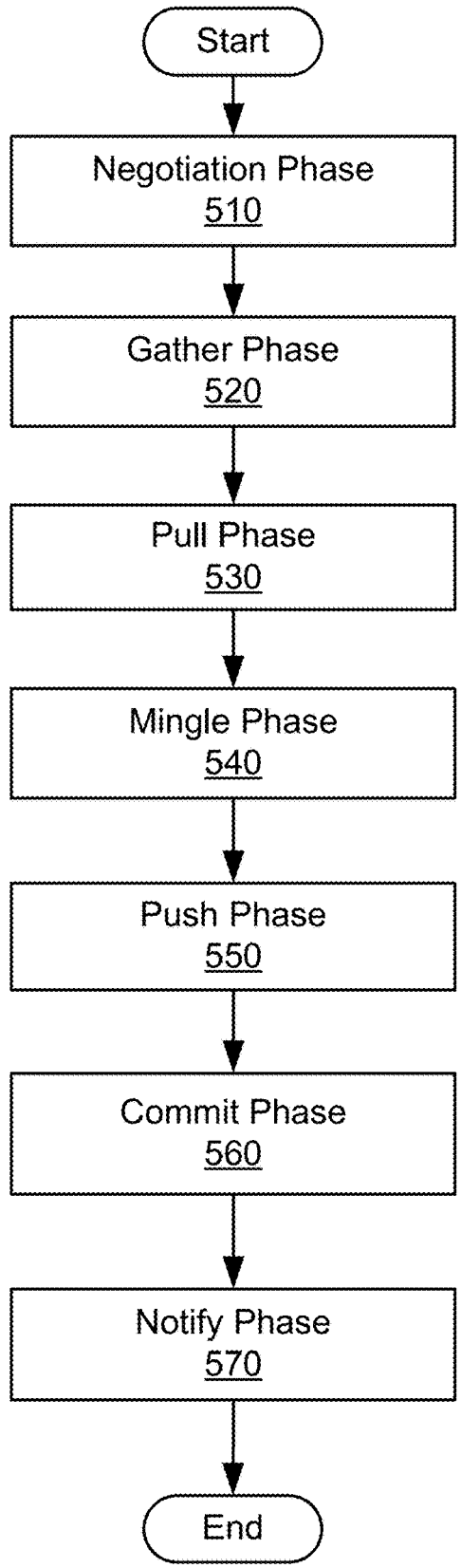
FIGS. 5a, 5b, 5c, 5d, 5e, 5f, 5g and 5h shown an example of sync server processing.
Figure 5B:
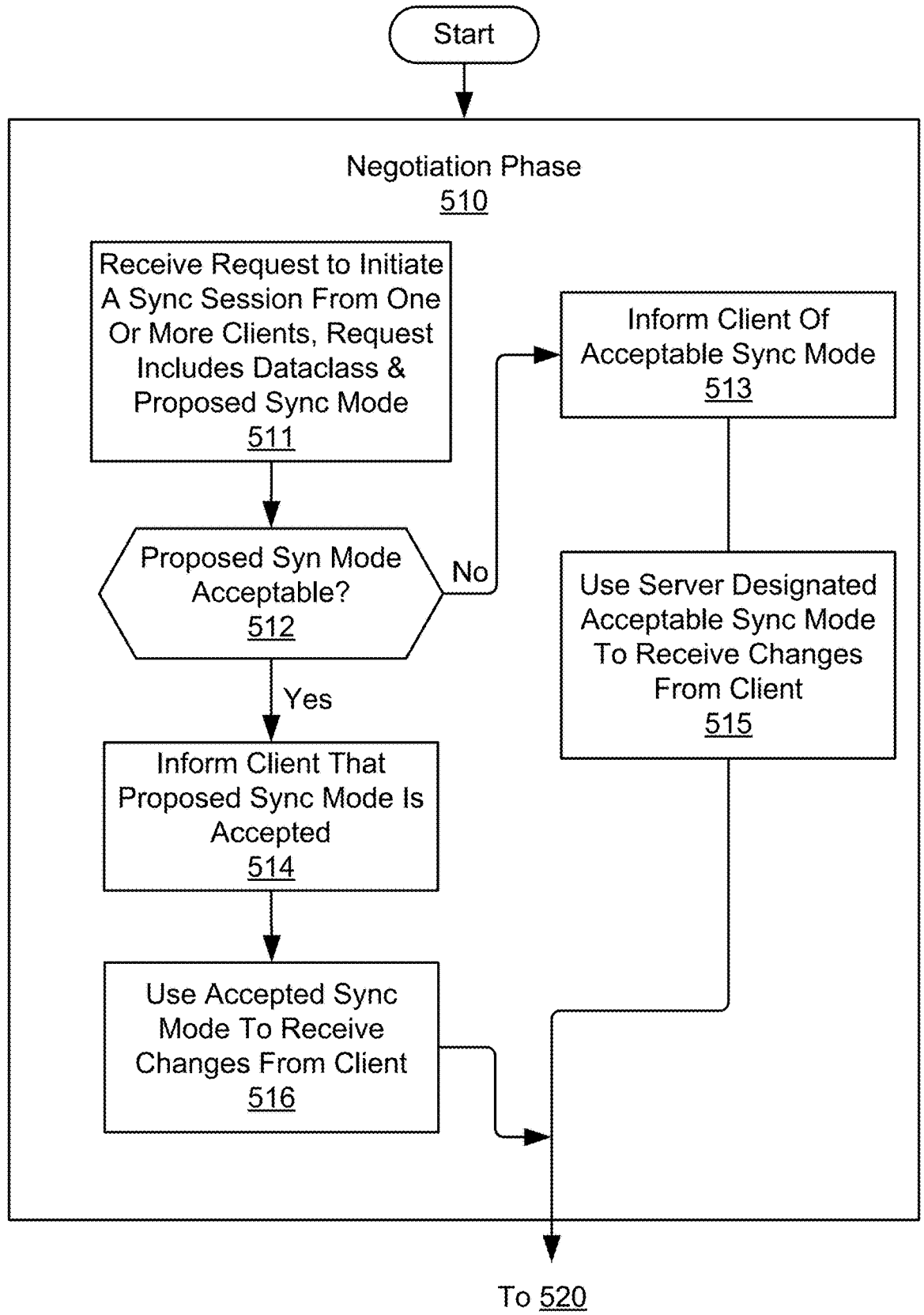
Figure 5C:
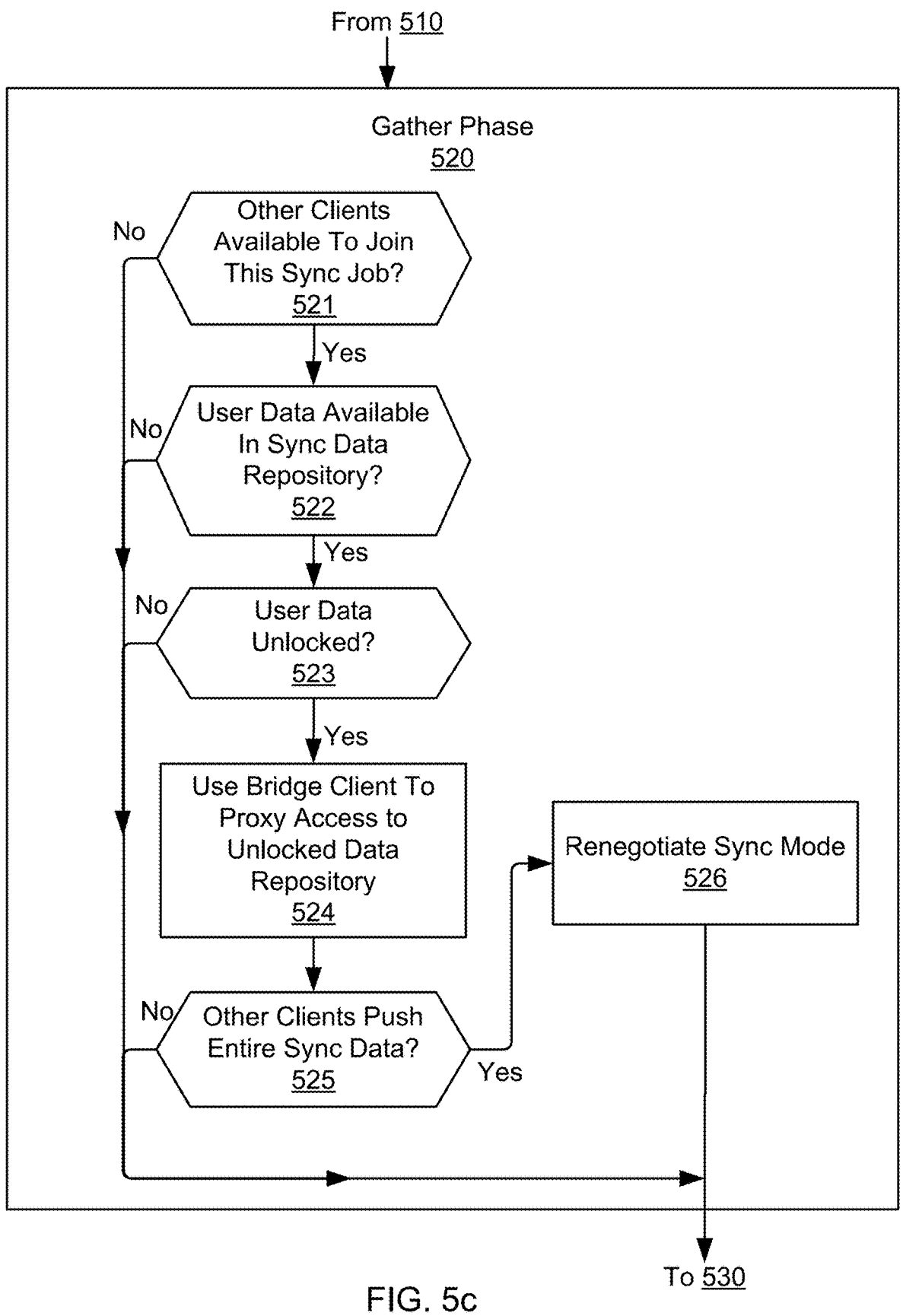
Figure 5D:
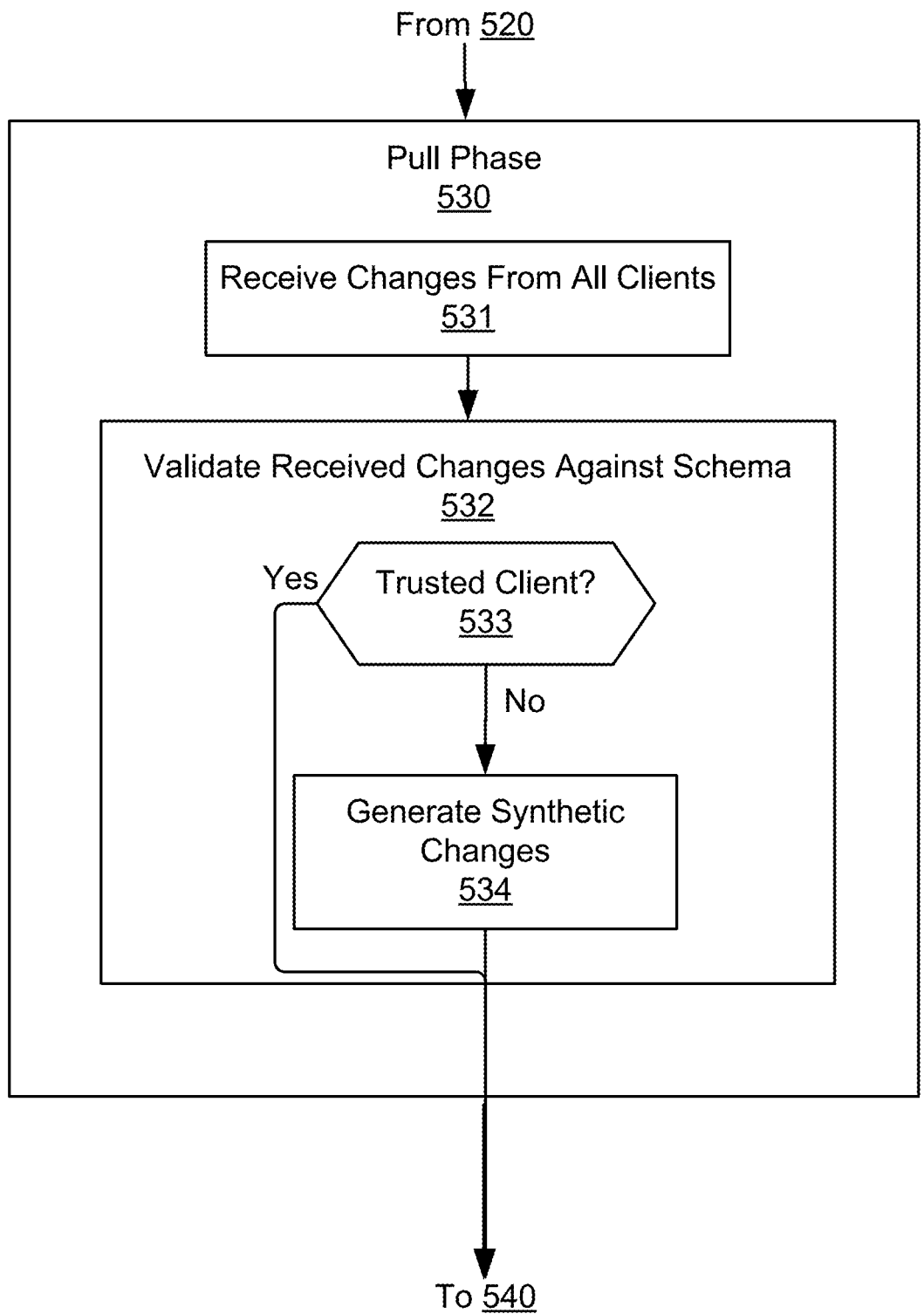
Figure 5E:
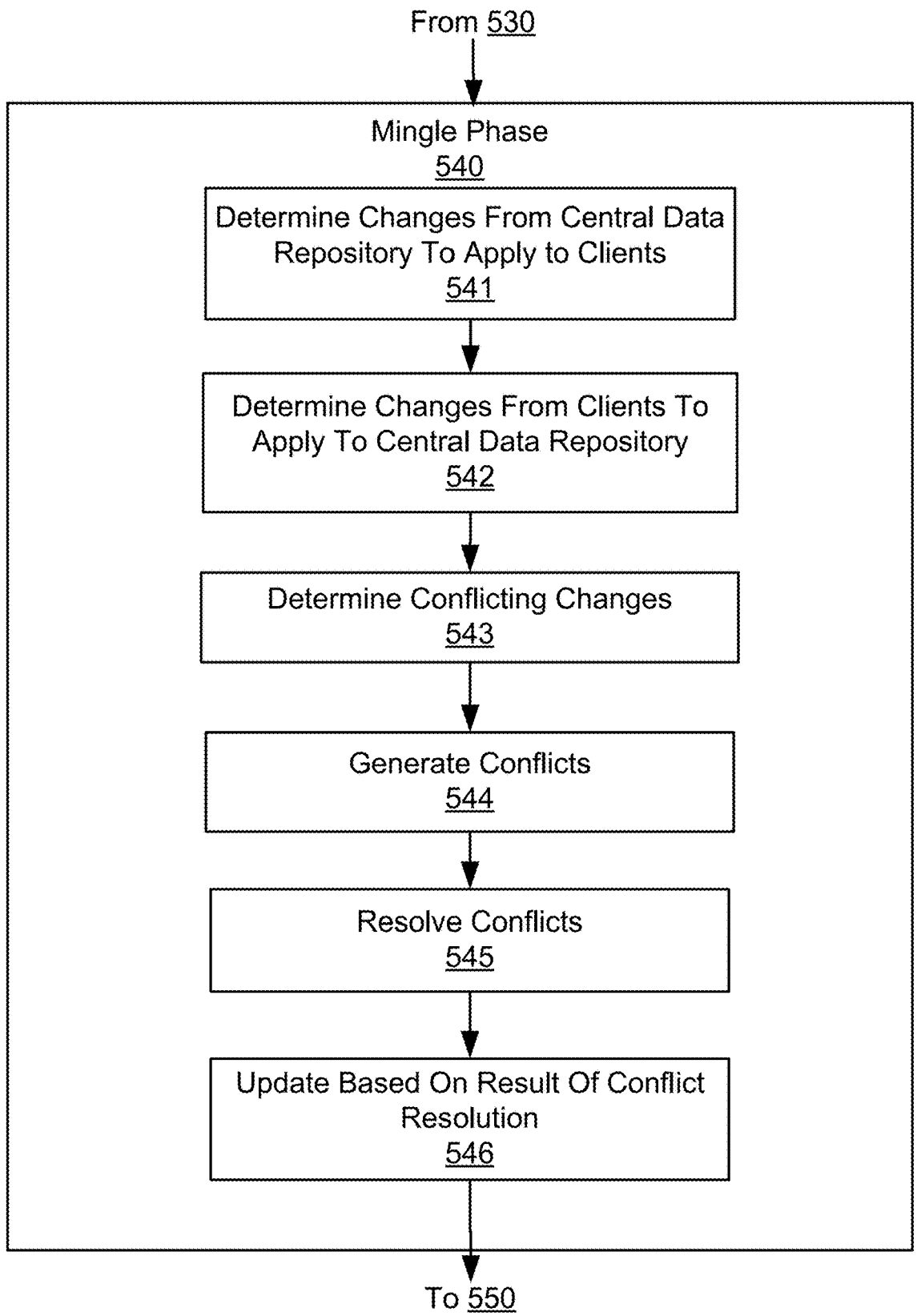
Figure 5F:
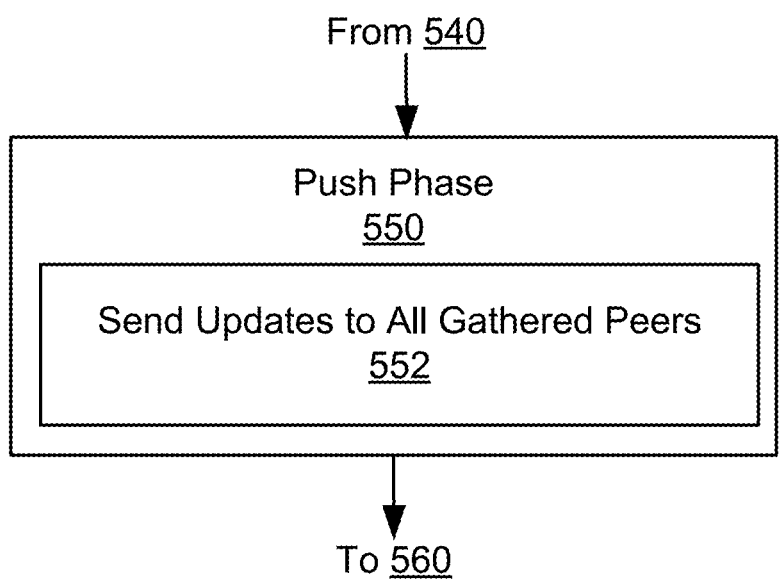
Figure 5G:
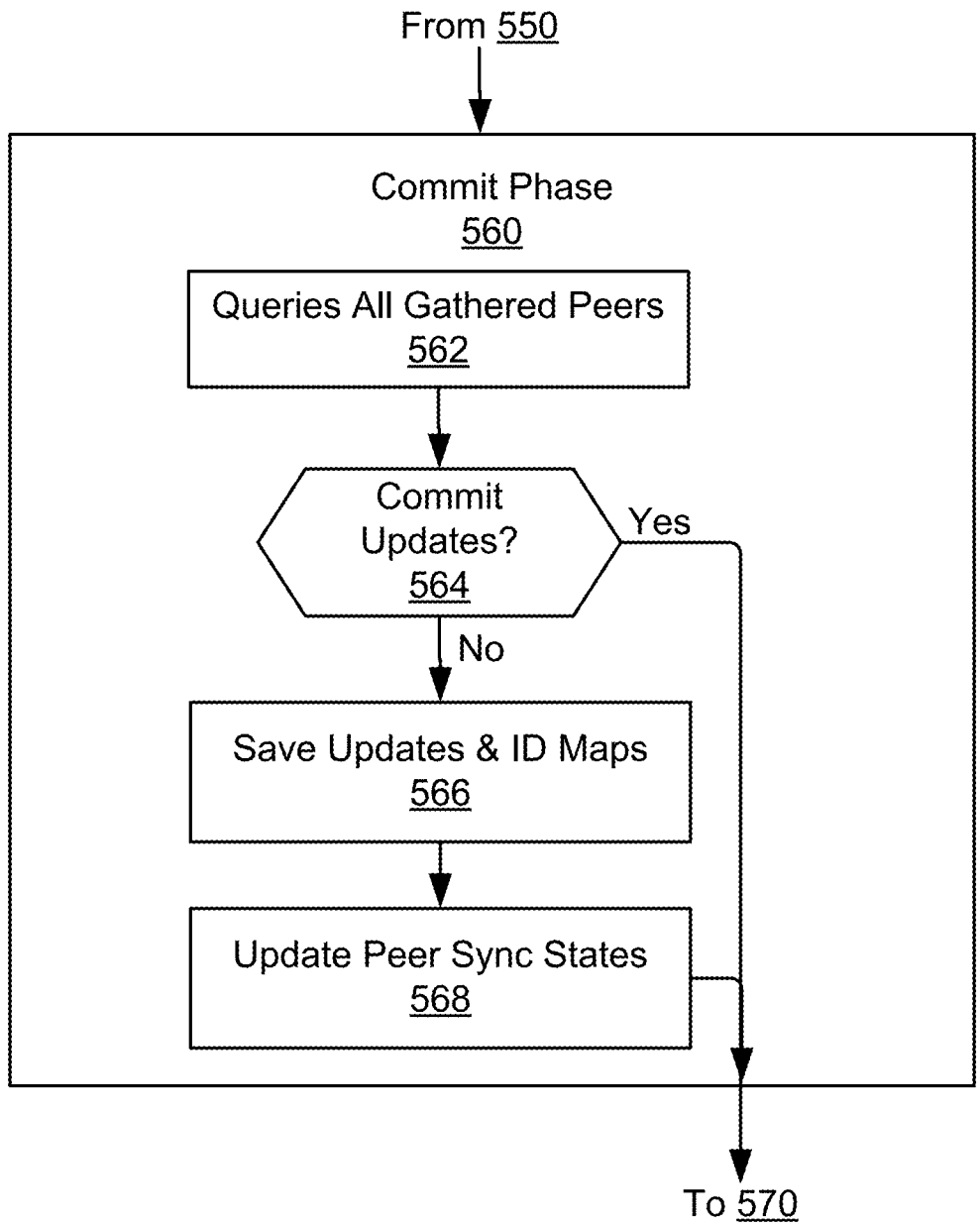
Figure 5H:
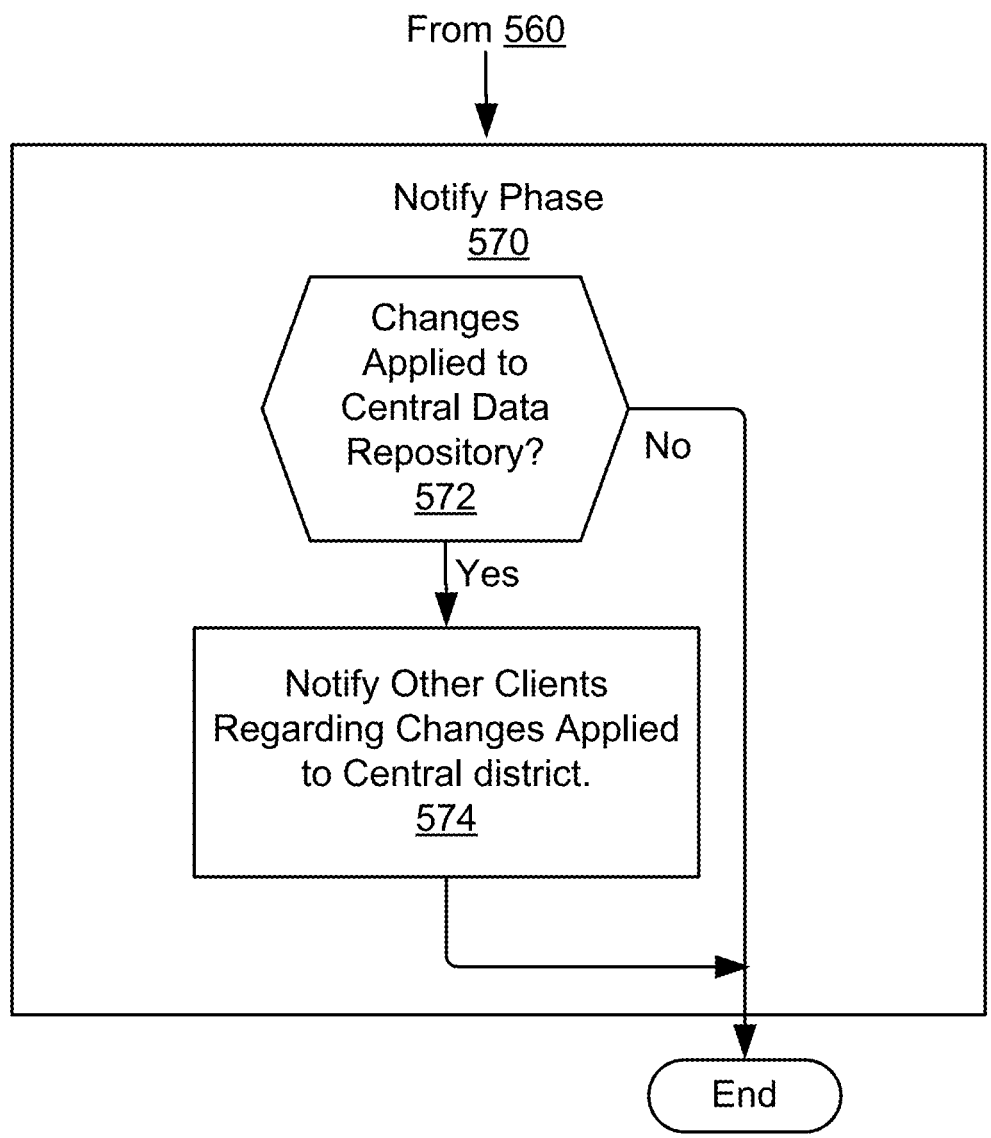

FIG. 4 is a block diagram showing an example sync server system architecture. The system architecture includes one or more clients 410 and 412 interfacing with the universal server 140 to sync one or more data records in one or more sync sessions. The clients 410, 412 can include computers such as those running Mac® OS X Tiger and Leopard. These clients 410 and 412 can be Dot Mac® clients connecting to one or more Dot Mac® services.

The clients 410 and 412 can make HTTP connections to the universal server 140 over a network 420. A network appliance 414 such as a router manages the connection to the destination. The universal server 140 can include a Sync-DAV server that provides an online storage server, such as iDisk®. The universal server 140 is connected to the central data repository 142 that operates as the most up-to-date and complete datastore. When updates are available, in response to changes sent by the clients 410, 412, the sync server 110 is notified. Then the sync server 110 can process sync sessions with the universal server 140 to receive the updates.

The sync server 110 can be connected to other Dot Mac® servers 416 to provide additional services and define the supported dataclasses and schemas. For example, Contacts, Calendars and Bookmarks dataclasses can be supported. Further, a separate server 418 and/or processor can be provided to manage the sync server 110.

FIGS. 5a, 5b, 5c, 5d, 5e, 5f, 5g and 5h show an example process 500 for processing sync sessions. During a negotiation phase 510, the sync server 110 receives 511 a request to initiate a sync session from one or more clients 120, 130, etc. The request received from the one or more clients 120, 130, etc. includes a desired dataclass and a proposed sync mode for the dataclass. For example, a user operating a mobile device such as the iPhone® can enter a new name in the Contacts dataclass. In response to the entered new name, a request to initiate a sync session can be sent from the client to the sync server 31 to initiate a sync session with the sync server 110. The sync server 110 determines 512 whether the proposed sync mode is acceptable. When the sync server 110 determines that the proposed sync mode is not acceptable, the sync server 110 informs 513 the one or more clients 120, 130 requesting to initiate the sync session of the acceptable sync mode (either slow or reset). When the sync server 110 determines that the proposed sync mode is acceptable, the sync server 110 informs 514 the client requesting to initiate the sync session that the proposed sync mode is accepted.

During a gather phase 520, the sync server 110 determines 521 whether other clients are available to join the current sync job. The current sync job can include synchronizing the Contacts dataclass. When other clients are available, the sync server 110 determines 522 whether the user has data in the central data repository 142 and whether 523 the data is not locked. When unlocked, a bridge client is used 524 to proxy access to the user data in the central data repository 142. For example, when the user operating the iPhone® has the Contacts dataclass in the central data repository 142 (e.g., a SyncDAV datastore). The sync server 110 checks to see whether the Contacts dataclass in the central data repository is unlocked. When the sync server 110 determines that the Contacts dataclass is unlocked, a bridge client that proxies access to the central repository is added to the sync job as a "peer client". The sync server 110 also determines 525 whether the gathered peer wishes to push the sync data. When the gathered peer wishes to push replacement data for the entire dataset (e.g. the peer wishes to push the Truth), the sync mode for the initiator is renegotiated 526. The other peers will be required to accept "reset" sync mode.

During a pull phase 530, the sync server 110 receives 531 changes from all clients 120, 130, etc. The sync server 110 validates 532 the received changes against the schema defined by the server 110. The sync server 110 determines 533 whether the clients are trusted or untrusted. When detected that a client is an untrusted client, synthetic changes are generated 534 to enforce relational integrity of the schema, In addition, the one or more clients 120, 130 are selectively identified 504 as one of a trusted client and an untrusted client based on one or more properties of the sync session. A trusted client is configured to fulfill a certain contract with the sync server 110. For example, a trusted client supports the use of sync server ID as the native ID. Thus, the Local Unique Identification (LUID) of the trusted client is replaced by the Universal Unique Identification (UUID) generated by the sync server 110. In addition, a trusted client supports all entities, properties and dataclasses defined by the sync server 110. Further, a trusted client can guarantee that changes injected are maintained according to the schema of the dataclass being synchronized. The schemas or dataclasses supported by the sync server include Contacts, Calendars and Bookmarks, for example.

During a mingle phase 540, the sync server 110 performs the following for each client: (1) determine what 541 updates from the central data repository 142 should go to each client; (2) determine 542 which changes from each client should be sent to the peers; and (3) identify 543 which changes from the central data repository 142 or peers conflict with one another. Based on the identifying, one or more conflicts are generated 544. Each conflict includes the record id in conflict, client1 (the initiator), client2 (either a peer or the Truth), the set of conflicting property names, the set of common property names, the set of "weak" property names, etc. The generated conflicts are resolved 545 based on a relative temporal ordering of events. For example, changes from the initiator are considered "later" than changes from the central data repository 142 and from gathered peers. The identified "later changes" typically "wins" the conflict (i.e. the winner's changes override the loser's changes.) An exception exists when a change from the initiator is considered "weak" with respect to the changes from the gathered peers. When a conflict is resolved, values of all conflicting properties from the winner (e.g., wining client, winning gathered peer or winning central data repository 142, etc.) are applied to the conflicting record. The result is applied 546 to the central data repository and to the losing clients, losing gathered peers, etc. as updates.

Conflicts can occur when two or more clients sync with the sync server to update or change the same records. For example, the sync server 110 can process a sync session with one of the clients for an update to the one or more data records. The sync server 110 can process another sync session with another one of the clients for another update to the one or more data records. When one or more conflicts are detected between the two sync sessions, the identified conflicts can be resolved 514 by assigning a priority to the most recent one of the sync sessions. Thus, the changes sent by the client involved in the most recent or sync session wins out over the earlier conflicting changes sent by another client. As described above, there may be exceptions to this general rule. For example, earlier FLD changes may win over more current RLD changes in some instances.

When no conflicts are detected, the sync data repository 112 is updated 512 to reflect the changes from the sync session(s). Also, after the conflicts are resolved, the sync server 112 can be updated.

During a push phase 550, the sync server 110 sends 552 updates to all peers. During a commit phase 560, the sync server queries 562 all peers to determine 564 whether the peers can commit updates and id mappings. When detected that the peers cannot commit, the sync server 110 saves 566 updates and idmaps so the saved updates and idmaps can be sent to the client next time the client requests to initiate a sync session. The sync server 110 also updates 568 peer sync states using the anchors and next sync mode.

During a notify phase 570, the sync server 110 determines 572 whether changes were applied to the central data repository 142. When detected that the changes were applied to the central data repository 142, the sync server 110 notifies 574 other known clients which sync the changed dataclass 510 applied to the central data repository 142.

Figure 6:
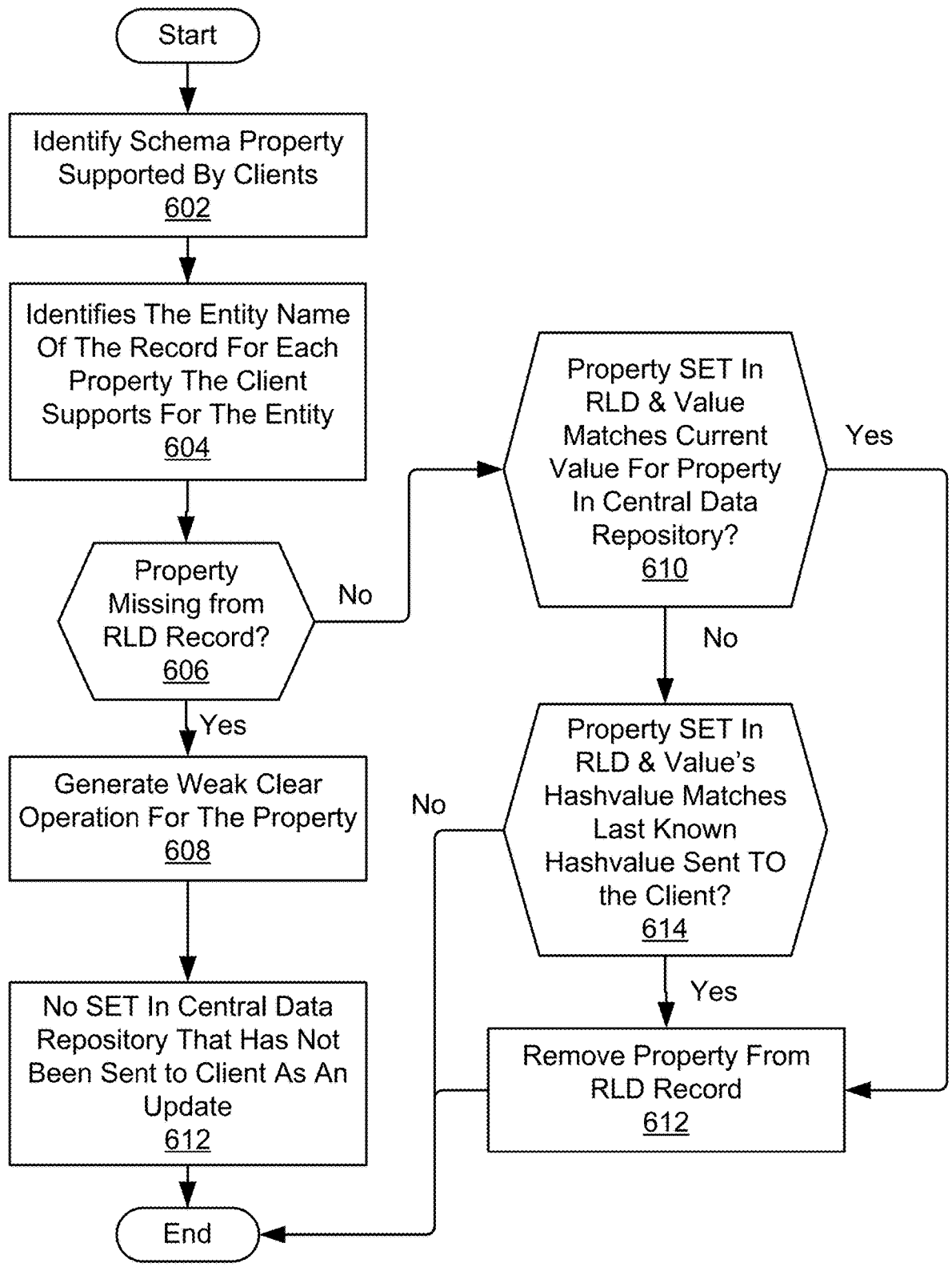
FIG. 6 shows an example server process for performing RLD to FLD conversions.

FIG. 6 shows an example server process for performing RLD to FLD conversions. When processing the requested sync sessions with the one or more clients 120, 130, that support RLD, the sync server 110 can also perform RLD to FLD conversion. Any supported property that has a value in the record stored in the central data repository 142 but which has no SET in the client RLD RecordChange, and for which there is no SET operation in the central data repository history that is yet to be sent to the client as an update is meant to be treated as a CLEAR from the client 120, 130. Any supported property from the client 120, 130 which has a SET with a value matching the current value of the property in the central data repository may be removed from the RLD RecordChange.

Clients 120, 130 that support field level differencing sends changed data items only for the one or more data records to be updated. In contrast, client 120. 130 that support record level differencing sends all of the data items included in the one or more data records to be updated.

In the example shown in FIG. 6, the sync server 110 identifies 602 the schema properties supported by the client 120, 130 as specified in the client description plist (client-description.plist.) For each RLD record that is a MODIFY command (e.g. we can ignore ADDs or DELETEs), the sync server 110 determines or identifies 604 the entity name of the record (e.g. com.apple.contacts.Contact) for each property the client supports for the entity. The sync server 110 determines 606 whether the property is missing from the RLD record. When the sync server 110 detects the property as being missing from the RLD record, the sync server 110 generates 608 a "weak" CLEAR operation for the property and there is no SET in the central data repository 142 that has not been sent 612 to the client 120, 130 as an update. Else if the property is SET in the RLD record and the value matches 610 the current value for the property in the central data repository, the sync server 110 removes 612 the property from the RLD record. Else if the property is SET in the RLD record and the value's hashvalue matches 614 the last known hashvalue sent to the client, the sync server 110 remove 612 the property from the RLD record.

Also, once the sync session results in changes to the data records, a change log can be generated for all change associated with the one or more data record. A change log is a representation of all changes for a schema dataclass which were applied during a given sync session, The change logs can be serialized to accumulate the changes. Thus, changes can be updated little by little or all at once. Using the bridge client, the sync server 110 can access the data stored in the central data repository 142. Once accessed, the sync server 110 can use the change logs to update the central data repository 142 connected to the universal server 140. Thus, the generated change logs can be used to update the central data repository 142, the "Truth".

Based on the processed sync session, the sync server 110 can determine whether the one or more clients 120, 130 support 540 FLD or RLD. For example, the sync mode indicated by the clients can be slow and thus indicating RLD. Further, the data representation for the change can indicate whether the client device 130 and/or the web clients 120 are using RLD or FLD for a given dataclass. When the one or more clients are configured to support record level differencing, the sync server 110 performs RLD to FLD conversion 542 to identify the changed data items in the one or more data records. The sync server 110 can compare the data records sent by the clients with the sync data repository 112 to identify the data items in the data records that have changed. Those data items that are the same as the sync data repository 112 are dropped. When the sync server 110 determines that the clients support FLD, all data items in the data records sent by the clients are accepted 544 as changed data. This includes added, modified and deleted data.

In addition, when detected that the one or more clients are identified as the untrusted client, one or more discrepancies can be detected in the sync session associated with the untrusted client from a schema defined by the server for the one or more data records involved in the sync session associated with the untrusted client.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input. Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method comprising:
    identifying a computer system as a trusted client that supports a schema defined by a server system synchronizing a first data repository hosted by the server system with a second data repository hosted by the computer system, the synchronizing comprising:
        setting, by the server system, authoritative universal unique identifiers (UUIDs) for data items of the first data repository, wherein the schema defined by the server system comprises the authoritative UUIDs for data items;
        providing, from the server system to the computer system, the authoritative UUIDs for use as references of data items of the second data repository in lieu of local unique identifiers (LUIDs) of the data items of the second data repository hosted by the computer system; and
        synchronizing the data items of the first data repository with the data items of the second data repository using references to the authoritative UUIDs without maintaining a mapping of the authoritative UUIDs to the LUIDs.

2. The method of claim 1, wherein
    at least one device of the plurality of the devices is a trusted client configured to support the data structure defined by the server system for the data repository hosted by the server system and supported by the computer system, wherein the at least one device of the plurality of devices that is a trusted client is configured to support the unique identifier for each synchronized data item that is also supported by the server system, and at least one device of the plurality of the devices is an untrusted client that is not configured to support the data structure or the unique identifier,
    the method further comprising selectively identifying whether a device of the plurality of devices is a trusted or an untrusted client based on one or more properties of a request received from the device to synchronize data records stored at the device.

3. The method of claim 2, wherein
    said receiving the requests from the plurality of devices to synchronize the data records stored at the plurality of devices comprises:

receiving, with a request from a device identified as a trusted client, only changed data items included in one or more data records stored by the trusted client to be synchronized, and receiving, with another request from a device identified as an untrusted client, changed and unchanged data items included in one or more data records stored by the untrusted client to be synchronized, and said synchronizing the data records stored at the plurality of devices with corresponding data records from the data repository hosted by the computer system comprises:

performing field level differencing to update the changed data items included in one or more data records from the data repository hosted by the computer system corresponding to the one or more data records referenced by the request from the trusted client, and performing record level differencing to update one or more data records from the data repository hosted by the computer system corresponding to the one or more data records referenced by the request from the untrusted client;

the field level differencing and record level differencing resulting in the modified data records having the same data structure as the data structure defined by the server system for the data repository hosted by the server system.

4. The method of claim 2, further comprising:

receiving a request from a device identified as an untrusted client including a change of a data record stored at the untrusted client;

in response to determining that the change is invalid against the data structure, generating, by the computer system, a synthetic change of the data record that is valid against the data structure; and updating a data record from the data repository hosted by the computer system corresponding to the data record stored at the untrusted client that includes the synthetic change;

the updating resulting in the updated data records having the same data structure as the data structure defined by the server system for the data repository hosted by the server system.

5. The method of claim 1, further comprising:

determining that data records from the data repository hosted by the server system corresponding to the data records from the data repository hosted by the computer system, that have been synchronized with the data records stored at the plurality of devices, are unlocked; and performing said synchronizing the data repository hosted by the computer system, that has been synchronized with the data records stored at the plurality of devices, with the data repository hosted by the server system, in response to said determining.

6. A non-transitory computer readable storage medium encoding instructions that when executed by a server system cause the server system to execute operations comprising:

identify a computer system as a trusted client that supports a schema defined by the server system;

synchronizing a first data repository hosted by the server system with a second data repository hosted by the computer system, the synchronizing comprising:

setting, by the server system, authoritative universal unique identifiers (UUIDs) for data items of the first data repository;

providing, from the server system to the computer system, the authoritative UUIDs for use as references of data items of the second data repository in lieu of local unique identifiers (LUIDs) of the data items of the second data repository hosted by the computer system; and synchronizing the data items of the first data repository with the data items of the second data repository using references to the authoritative UUIDs without maintaining a mapping of the authoritative UUIDs to the LUIDs.

7. The non-transitory computer readable storage medium of claim 6, wherein at least one device of the plurality of the devices is a trusted client configured to support the data structure defined by the server system for the data repository hosted by the server system and supported by the computer system, wherein the at least one device of the plurality of devices that is a trusted client is configured to support the unique identifier for each synchronized data item that is also supported by the server system, and at least one device of the plurality of the devices is an untrusted client that is not configured to support the data structure, and wherein the operations further comprise selectively identifying whether a device of the plurality of devices is a trusted or an untrusted client based on one or more properties of a request received from the device to synchronize data records stored at the device.

8. The non-transitory computer readable storage medium of claim 7, wherein said receiving the requests from the plurality of devices to synchronize the data records stored at the plurality of devices comprises:

receiving, with a request from a device identified as a trusted client, only changed data items included in one or more data records stored by the trusted client to be synchronized, and receiving, with another request from a device identified as an untrusted client, changed and unchanged data items included in one or more data records stored by the untrusted client to be synchronized, and said synchronizing the data records stored at the plurality of devices with corresponding data records from the data repository hosted by the computer system comprises:

performing field level differencing to update the changed data items included in one or more data records from the data repository hosted by the computer system corresponding to the one or more data records referenced by the request from the trusted client, and performing record level differencing to update one or more data records from the data repository hosted by the computer system corresponding to the one or more data records referenced by the request from the untrusted client;

the field level differencing and record level differencing resulting in the modified data records having the same data structure as the data structure defined by the server system for the data repository hosted by the server system.

9. The non-transitory computer readable storage medium of claim 7, wherein the operations further comprise:

receiving a request from a device identified as an untrusted client including a change of a data record stored at the untrusted client;

in response to determining that the change is invalid against the data structure, generating a synthetic change of the data record that is valid against the data structure; and updating a data record from the data repository hosted by the computer system corresponding to the data record stored at the untrusted client that includes the synthetic change;

the updating resulting in the updated data records having the same data structure as the data structure defined by the server system for the data repository hosted by the server system.

10. The non-transitory computer readable storage medium of claim 6, wherein the operations further comprise:

determining that data records from the data repository hosted by the server system corresponding to the data records from the data repository hosted by the computer system, that have been synchronized with the data records stored at the plurality of devices, are unlocked; and performing said synchronizing the data repository hosted by the computer system, that has been synchronized with the data records stored at the plurality of devices, with the data repository hosted by the server system, in response to said determining.

11. A computer system comprising:

a data processing apparatus communicatively coupled with a device; and memory configured to store a first data repository and instructions that when executed by the data processing apparatus cause the computer system to execute operations comprising:

identifying the device as a trusted client that supports a schema defined by the computer system;

synchronizing a second data repository hosted by the device with first data repository hosted by the computer system, the synchronizing comprising:

setting, by the computer system, authoritative universal unique identifiers (UUIDs) for data items of the first data repository;

providing, from the computer system to the device, the authoritative UUIDs for use as references of data items of the second data repository in lieu of local unique identifiers (LUIDs) of the data items of the second data repository maintained by the device; and synchronizing the data items of the first data repository with the data items of the second data repository using references to the authoritative UUIDs without maintaining a mapping of the authoritative UUIDs to the LUIDs.

12. The system of claim 11, wherein at least one device of the plurality of the devices is a trusted client configured to support the data structure defined by the server system for the second data repository and supported by the computer system, wherein the at least one device of the plurality of devices that is a trusted client is configured to support the unique identifier for each synchronized data item that is also supported by the second data repository, and at least one device of the plurality of the devices is an untrusted client that is not configured to support the data structure, and wherein the operations further comprise selectively identifying whether a device of the plurality of devices is a trusted or an untrusted client based on one or more properties of a request received from the device to synchronize data records stored at the device.

13. The system of claim 12, wherein said receiving the requests from the plurality of devices to synchronize the data records stored at the plurality of devices comprises:

receiving, with a request from a device identified as a trusted client, only changed data items included in one or more data records stored by the trusted client to by synchronized, and receiving, with another request from a device identified as an untrusted client, changed and unchanged data items included in one or more data records stored by the untrusted client to be synchronized, and said synchronizing the data records stored at the plurality of devices with corresponding data records from the first data repository comprises:

performing field level differencing to update the changed data items included in one or more data records from the first data repository corresponding to the one or more data records referenced by the request from the trusted client, and performing record level differencing to update one or more data records from the first data repository corresponding to the one or more data records referenced by the request from the untrusted client;

the field level differencing and record level differencing resulting in the modified data records having the same data structure as the data structure defined by the server system for the second data repository hosted by the server system.

14. The system of claim 12, wherein the operations further comprise:

receiving a request from a device identified as an untrusted client including a change of a data record stored at the untrusted client;

in response to determining that the change is invalid against the data structure, generating a synthetic change of the data record that is valid against the data structure; and updating a data record from the first data repository corresponding to the data record stored at the untrusted client that includes the synthetic change;

the updating resulting in the updated data records having the same data structure as the data structure defined by the server system for the second data repository hosted by the server system.

15. The system of claim 11, wherein the operations further comprise:

determining that synchronized data items from the second data repository corresponding to the data records from the first data repository, that have been synchronized with the data records stored at the plurality of devices, are unlocked; and performing said synchronizing the first data repository, that has been synchronized with the data records stored at the plurality of devices, with the second data repository, in response to said determining.

* * * * *